(12) United States Patent
MacGregor et al.

(10) Patent No.: US 7,337,064 B2
(45) Date of Patent: Feb. 26, 2008

(54) ELECTROMAGNETIC SURVEYING FOR HYDROCARBON RESERVOIRS

(75) Inventors: Lucy M. MacGregor, Hampshire (GB);
Jennifer L. Rust, Hampshire (GB);
Martin C. Sinha, Hampshire (GB)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 10/521,625

(22) PCT Filed: May 30, 2003

(86) PCT No.: PCT/GB03/02379

§ 371 (c)(1),
(2), (4) Date: Nov. 10, 2005

(87) PCT Pub. No.: WO2004/008183

PCT Pub. Date: Jan. 22, 2004

(65) Prior Publication Data

US 2006/0129322 A1    Jun. 15, 2006

(30) Foreign Application Priority Data

Jul. 16, 2002    (GB)    ................................. 0216555.3

(51) Int. Cl.
*G01V 11/00*    (2006.01)
(52) U.S. Cl. ........................................................ 702/2
(58) Field of Classification Search .................... 702/2, 702/7, 13
See application file for complete search history.

(56) References Cited

U.S. PATENT DOCUMENTS 3,548,299 A    12/1970    Duroux et al.

(Continued)

FOREIGN PATENT DOCUMENTS

WO    98/11455    3/1998

(Continued)

OTHER PUBLICATIONS

Newman, G. "A Study of Downhole Electromagnetic Sources for Mapping Enhanced Oil Recovery Processes." *Geophysics, Society of Exploration Geophysicists*. 59.4 (Apr. 1994): 534-545.

(Continued)

*Primary Examiner*—Donald E McElheny, Jr.
(74) *Attorney, Agent, or Firm*—Renner, Otto, Boisselle & Sklar LLP

(57) ABSTRACT

An electromagnetic survey method for surveying an area of seafloor that is thought or known to contain a subterranean hydrocarbon reservoir, comprising obtaining a first survey data set with a vertical electric dipole (VED) antenna for generating vertical current loops and a second survey data set with a vertical magnetic dipole (VMD) antenna for generating horizontal current loops. In an alternative embodiment, the VMD antenna is dispensed with and the horizontal electromagnetic field is derived from the naturally occurring magnetotelluric (MT) electromagnetic field. In another alternative embodiment, the VED data is compared with a background geological model instead of VMD or MT data. The invention also relates to a survey apparatus comprising VED and VMD antennae, to planning a survey using this method, and to analysis of survey data taken using this survey method. The first and second survey data sets allow the galvanic contribution to the detector signals collected at a detector to he independently contrasted with the inductive effects. This is important to the success of using electromagnetic surveying for identifying hydrocarbon reserves and distinguishing them from other classes or structure.

41 Claims, 10 Drawing Sheets

U.S. PATENT DOCUMENTS

| | | | |
|---|---|---|---|
| 4,617,518 | A | 10/1986 | Srnka |
| 4,679,174 | A | 7/1987 | Gelfand |
| 4,792,761 | A * | 12/1988 | King et al. ............... 324/350 |
| 4,811,220 | A * | 3/1989 | McEuen ................... 702/16 |
| 5,345,179 | A * | 9/1994 | Habashy et al. ............ 324/338 |
| 5,770,945 | A | 6/1998 | Constable |
| 5,905,657 | A | 5/1999 | Celniker |
| 6,603,313 | B1 | 8/2003 | Srnka |
| 2002/0079899 | A1 | 6/2002 | Frey et al. |
| 2003/0050759 | A1 | 3/2003 | Srnka |

FOREIGN PATENT DOCUMENTS

| | | |
|---|---|---|
| WO | 00/13046 | 3/2000 |
| WO | 01/57555 | 8/2001 |
| WO | 02/14906 | 2/2002 |

OTHER PUBLICATIONS

Constable S.C. et al. "Marine Magnetotellurics for Petroleum Exploration Part 1: A Sea-Floor Equipment System." *Geophysics, Society of Exploration Geophysicists*. 63.3 (May 1998): 816-825.

Edwards, R.N. et al. "First Results of the MOSES Experiment: Sea Sediment Conductivity and Thickness Determination, Bute Inlet, British Columbia, by Magnetometric Offshore Electrical Sounding." *Geophysics, Society of Exploration Geophysicists*. 50.1 (Jan. 1985): 153-160.

Withers et al. "A Case Study of Integrated Hydrocarbon Exploration Through Basalt." *Geophysics, Society of Exploration Geophysicists*. 59.11 (Nov. 1994): 1666-1679.

Kellet R. et al. "The Effects of Source Polarization in CSAMT Data Over Two Massive Sulfide in Australia." *Geophysics, Society of Exploration Geophysicists*. 58.12 (Dec. 1993): 1764-1772.

Urquhart S. et al. "Combining CSAMT and MT in Difficult Exploration Environments." *The Leading Edge, Society of Exploration Geophysicists*. 16.4 (Apr. 1997): 383-384.

Sinha, M.C., et al. "An Active Source Electromagnetic Sounding System for Marine Use." *Marine Geophysical Researches*. 12 (1990): 59-68.

Evans, R. L. et al. "On the Electrical Nature of the Axial Melt Zone at 13° N on the East Pacific Rise." *Journal of Geophysical Research*. 99.B1 (1994): 577-588.

Eidesmo, T., et al. "Sea Bed Logging (SBL), a New Method for Remote and Direct Identification of Hydrocarbon Filled Layers in Deepwater Areas." *first break*. 20.3 (Mar. 2002): 144-152.

Ellingsrud, S., et al. "Remote Sensing of Hydrocarbon Layers by Sea-bed Logging (SBL): Results from a cruise offshore Angola." *The Leading Edge*. 2002.

MacGregor, L. M. et al. "Use of Marine Controlled Source Electromagnetic Sounding for Sub-basalt Exploration." *Geophysical Prospecting*. 48 (2000): 1091-1106.

MacGregor, L.M., et al. The RAMESSES Experiment III: Controlled Source Electromagnetic Sounding of the Reykjanes Ridge at 57° 45' N. *Geophysical Journal International*. 135 (1998): 773-789.

MacGregor, L., et al. "Electrical Resistivity Structure of the Valu Fa Ridge, Lau Basin, From Marine Ccontrolled Source Electromagnetic Sounding." *Geophysical Journal International*. 146 (2001): 217-236.

Chave, A.D. et al. "Controlled Electromagnetic Sources for Measuring Electrical Conductivity Beneath the Oceans, 1. Forward Problem and Model Study." *Journal of Geophysical Research*. 87.B7 (1982): 5327-5338.

Coggon, J.H. et al. "Electromagnetic Investigation of the Seafloor." *Geophysics*. 35.3 (1970): 476-489.

Edwards, R. N., et al. "On Measuring the Electrical Conductivity of the Oceanic Crust by a Modified Magnetometric Resistivity Method." *Journal of Geophysical Research*. 86.B12 (1981): 11609-11615.

Chave Alan D. et al. "Electrical Exploration Methods for the Seafloor." *Applied Geophysics*. 2 (1991): 931-966.

* cited by examiner

ELECTROMAGNETIC SURVEYING FOR HYDROCARBON RESERVOIRS

This application is a national phase of International Application No. PCT/GB2003/002379 filed May 30, 2003 and published in the English language.

BACKGROUND OF THE INVENTION

The invention relates to seafloor electromagnetic surveying for oil and other hydrocarbon reserves.

Determining the response of the sub-surface strata within the earth's crust to electromagnetic fields is a valuable tool in the field of geophysical research. The geological structures associated with thermally, hydrothermally, tectonically or magmatically active regions can be studied. In addition, electromagnetic surveying, or sounding, techniques can provide valuable insights into the nature, and particularly the likely hydrocarbon content, of subterranean reservoirs in the context of subterranean oil exploration and surveying.

Seismic techniques are often used during oil exploration to identify the existence, location and extent of reservoirs in subterranean rock strata. Whilst seismic surveying is able to identify such structures, the technique is often unable to distinguish between the different possible compositions of pore fluids within them, especially for pore fluids which have similar mechanical properties. In the field of oil exploration, it is necessary to determine whether a previously identified reservoir contains oil or just aqueous pore fluids. To do this, an exploratory well is drilled to determine the contents of the reservoir. However, this is an expensive process, and one which provides no guarantee of reward.

Whilst oil-filled and water-filled reservoirs are mechanically similar, they do possess significantly different electrical properties and these provide for the possibility of electromagnetic based discrimination testing. A known technique for electromagnetic probing of subterranean rock strata is the passive magneto-telluric (MT method. The signal measured by a surface-based electromagnetic detector in response to electromagnetic (EM) fields generated naturally, such as within the earth's upper atmosphere, can provide details about the surrounding subterranean rock strata. However, for deep-sea surveys, all but those MT signals with periods corresponding to several cycles per hour are screened from the seafloor by the highly conductive seawater: Whilst the long wavelength signals which do penetrate to the seafloor can be used for large scale undersea probing, they do not provide sufficient spatial resolution to examine the electrical properties of the typically relatively small scale subterranean reservoirs. Moreover, since MT surveying relies primarily on horizontally polarised EM fields, it is intrinsically insensitive to thin resistive layers.

Nonetheless, measurements of electrical resistivity beneath the seafloor have traditionally played a crucial role in hydrocarbon exploration and reservoir assessment and development. In industry, subterranean resistivity data have generally been obtained almost exclusively by wire-line logging of wells. There are, though, clear advantages to developing non-invasive geophysical methods capable of providing such information from the surface or seafloor. Although inevitably such methods would be unable to provide comparable vertical resolution to wireline logging, the vast saving in terms of avoiding the costs of drilling test wells into structures that do not contain economically recoverable amounts of hydrocarbon would represent a major economic advantage.

In research fields that are not of commercial interest, geophysical methods for mapping subterranean resistivity variations by various forms of EM surveying have been in use for many years [1, 2, 3, 10]. Proposals for finding hydrocarbon reservoirs using such EM surveying have also been made [4, 5] and applications to the direct detection of hydrocarbons using horizontal electric dipole (HED) sources and detectors have proved successful [6, 7].

To successfully map subterranean resistivity variations in the field of oil exploration, the orientation of the current flows induced by EM signals must be carefully considered [6]. The response of seawater and subterranean strata (which will typically comprise planar horizontal layers) to EM signals is generally very different for horizontally and vertically flowing current components. For horizontally flowing current components, the coupling between the layers comprising the subterranean strata is largely inductive. This means the presence of thin resistive layers (which are indicative of hydrocarbon reservoirs) do not significantly affect the EM fields detected at the surface since the large scale current flow pattern is not affected by the thin layer. On the other hand, for vertical current flow components, the coupling between layers is largely galvanic (i.e. due to the direct transfer of charge). In these cases even a thin resistive layer strongly affects the EM fields detected at the surface since the large scale current flow pattern is interrupted by the resistive layer. It is known therefore that significant vertical components of induced current are required to satisfactorily perform an EM survey in the field of oil exploration.

However, sole reliance on the sensitivity of vertical current flow components to the presence of a thin resistive layer can lead to ambiguities. The effects on detected EM fields arising from the presence a thin resistive layer can be indistinguishable from the effects arising from other realistic large scale subterranean strata configurations. In order to resolve these ambiguities, it is known that it is necessary to determine the response of the subterranean strata to both horizontal (i.e. inductively coupled) and vertical (i.e. vertically coupled) induced current flows [6].

Hence it is important when designing a practical EM survey for detecting buried hydrocarbon reservoirs to distinguish between source and detector configurations in which the coupling between layers is largely inductive due to horizontal currents (in which case the survey has little sensitivity to the presence of a thin reservoir) and those in which the coupling between layers is largely galvanic due to vertical currents (in which case blocking of the passage of this current flow by a reservoir leads to a survey which is strongly sensitive to the presence and boundary of hydrocarbon within the reservoir).

FIG. 1a schematically shows a surface vessel 14 undertaking EM surveying of a subterranean strata configuration according to a previously proposed method [6]. The subterranean strata configuration includes an overburden layer 8, an underburden layer 9 and a hydrocarbon layer (or reservoir) 12. The surface vessel 14 floats on the surface 2 of the seawater 4. A deep-towed submersible vehicle 19 carrying a HED antenna 21 is attached to the surface vessel 14 by an umbilical cable 16 providing an electrical and mechanical connection between the deep-towed submersible vehicle 19 and the surface vessel 14. The RED antenna broadcasts a HED EM signal into the seawater 4.

One or more remote detectors 25 are located on the seafloor 6. Each detector 25 includes an instrument packages 26, a detector antenna 24, a floatation device 28 and a ballast weight (not shown). In practice, each detector antenna 24 will generally comprise an array of antenna elements, for example, a pair of orthogonal dipole antennae elements. The detector antenna 24 measures a signal in response to EM fields induced by the HED antenna in the vicinity of the detector 25. The instrument package 26 records the signals for later analysis.

The HED antenna 21 generates both inductive and galvanic current flow modes with the relative strength of each mode depending on HED antenna-detector geometry. At detector locations which are broadside to the HED antenna axis, the inductive mode dominates the response. At detector locations which are in-line with the HED antenna axis, the galvanic mode is stronger [6, 8, 9, 10]. The response at detector locations in both the in-line and broadside configurations is governed by a combination of the inductively and galvanically coupled modes and these tend to work in opposition.

FIG. 1b shows in plan view an example survey geometry according to the previously proposed method in which sixteen detectors 25 are laid out in a square grid on a section of seafloor 6 above a subterranean reservoir 56 having a boundary indicated by a heavy line 58. The orientation of the subterranean reservoir is indicated by the cardinal compass points (marked N, E, S and W for North, East, South and West respectively) indicated in the upper right of the figure. To perform a survey, a source starts from location 'A' and is towed along a path indicated by the broken line 60 through location 'B' until it reaches location 'C' which marks the end of the survey path. As is evident, the tow path first covers four parallel paths aligned with the North-South direction to drive over the four "columns" of the detectors. This part of the survey path moves from location 'A' to 'B'. Starting from location 'B', the survey path then covers four paths aligned with the East-West direction which drive over the four "rows" of detectors. Each detector is thus driven over in two orthogonal directions. The survey is completed when the source reaches the location marked 'C'.

During the towing process, each of the detectors 25 presents several different orientation geometries with respect to the source. For example, when the source is directly above the detector position D1 and on the North-South aligned section of the tow path, the detectors at positions D5, D6 and D7 are at different ranges in an end-on position, the detectors at positions D2, D3 and D4 are at different ranges in a broadside position and the detector at positions D8 and D9 are midway between. However, when the source later passes over the detector position D1 when on the East-West aligned section of the tow path, the detectors at positions D5, D6 and D7 are now in a broadside position, and the detectors at position D2, D3 and D4 are in an end-on position. Thus, in the course of a survey, and in conjunction with the positional information of the source, data from the detectors can be used to provide details of the signal transmission through the subterranean strata for a comprehensive range of distances and orientations between source and detector, each with varying galvanic and inductive contributions to the signal propagation. In this way a simple continuous towing of the source can provide a detailed survey which covers the extent of the subterranean reservoir.

This previously proposed method has been demonstrated to provide good results in practice. However, some limitations of the method have been identified.

Firstly, since the two modes cannot be easily separated there will generally be a level of cross-talk between them at a detector and this can lead to ambiguities in the results.

Secondly, in order to obtain survey data from both in-line and broadside geometries, the HED antenna needs to be re-oriented at each HED antenna survey location. This requires the surface vessel to make multiple passes over broadcast locations and can lead to complex and long tow patterns.

Thirdly, a HED antenna based EM survey can only provide the best data possible at discrete survey locations. This is because of the geometric requirements of a HED antenna survey which dictate that, at any point during the survey, data can only be optimally collected from those detectors to which the HED antenna is arranged either in-line or broadside. At other orientations, separation of the inductively and galvanically coupled signals becomes more much difficult and data are less reliable. For instance, referring to FIG. 1b, when the HED antenna is at a point on the tow path above the detector marked D1 and on the North-South aligned section of the tow path, in-line data can only be collected from the detectors marked D5, D6 and D7, whilst broadside data can only be collected form the detectors marked D2, D3 and D4. The other detectors provide only marginally useful information at this point of the survey. Furthermore, if the HED antenna is at the location identified by reference numeral 57 in FIG. 1b which is on a North-South aligned section of the tow path, in-line data can be collected from the detectors marked D3, D8, D9 and D10, but broadside data cannot be collected from any of the detectors. Since both broadside and in-line data are required for optimal analysis, the best data possible with the square detector array shown in FIG. 1b can only be collected from points along the tow path directly above the detector locations.

SUMMARY OF THE INVENTION

According to a first aspect of the invention there is provided an electromagnetic survey method for surveying an area that potentially contains a subterranean hydrocarbon reservoir, comprising: obtaining a first survey data set using a vertical electromagnetic source signal; and obtaining a second survey data set using a horizontal electromagnetic source signal.

In this case, references to vertical and horizontal indicate that a significant component, preferably a major component, of the respective signals should be aligned with the vertical and horizontal axes. It is not necessary that the signals are perfectly, or even closely, aligned to the vertical and horizontal axes, although fairly close alignment is preferred to provide a strong signal and reduce the complexity of analysis, for example alignment within +/−30° is desirable.

The vertical electromagnetic source signal is preferably provided by a vertical electric dipole (VED) source. The VED source can be towed over the survey area above the seafloor by a surface vessel and interconnecting umbilical cable.

The horizontal electromagnetic source signal is preferably provided by a vertical magnetic dipole (VMD) source. The VMD source can also be towed over the survey area above the seafloor by a surface vessel and interconnecting umbilical cable.

Most preferably, the VED source and VMD source are part of a single submersible tow vehicle and the collection of the first and second survey data sets is done concurrently, typically by towing the vehicle over the seafloor along a predefined survey path. During surveying, the tow vehicle can be switched at short intervals between activation of the VED source and the VMD source. Alternatively, the VED and VMD sources can be operated simultaneously at different frequencies to allow easy separation of the two signals at the detectors. In either case, the complete survey can be carried out with a single tow, i.e. both the first and second survey data sets can be obtained concurrently. In contrast, in previously proposed EM survey methods based on use of a survey vehicle with a HED antenna, two sets of survey data had to be obtained with different tows over different paths in order to probe the response of an area of interest galvanically and inductively. Being able to collect the first and second survey data sets concurrently is of great practical advantage, since it obviates the need to perform two separate tows over different survey paths.

As an alternative to using a VMD source, the horizontal electromagnetic source signal could be provided by magnetotelluric (MT) electromagnetic fields, which are naturally occurring fields in the earth's upper atmosphere. In this case, the tow vehicle need only include a VED source. (A VED source for determining the resistivity and extent of large scale sedimentary structure is known [3, 16]. The known VED source extends over the full depth of the seawater in which it operates and is driven at the quasi-static limit.) If the second survey data set is obtained from MT electromagnetic fields, the data can be obtained concurrently with collection of the first survey data set or, more likely, at a different time.

Since a VED antenna generates electromagnetic field configurations which are sensitive to the presence of a thin resistive layer, whereas a VMD generates electromagnetic field configurations which are sensitive to the background structure, by operating the VED and VMD antennae at different frequencies, or consecutively at the same frequency, the galvanically and inductively coupled modes of current transfer can be easily separated, so avoiding the difficulty of the 'mixed-mode' fields generated in previously proposed survey methods.

Furthermore, the vertical electromagnetic signal induces significant components of electric current which are normal to a surface of a body of water in which the electromagnetic survey is performed. This limits the deleterious effects of the finite seawater depth compared to those seen in previously proposed electromagnetic survey methods. The vertical electromagnetic signal can therefore be operated in shallower water than has previously been possible and allows electromagnetic surveying to be performed in areas which have not previously been amenable to electromagnetic surveying.

If the first survey data set is obtained by towing a source of the vertical electromagnetic signal along a tow-path relative to an array of detectors within the area of interest, a comprehensive survey can be performed rapidly. Furthermore, because patterns of current flow induced by vertical electric dipole (and vertical magnetic dipole) electromagnetic signals are cylindrically symmetric, detector data can be consistently and reliably collected from all detectors within the array for all source locations. This has not been possible with previously proposed survey methods for which data can only be reliably collected for specific relative orientations of the source and detector. Furthermore, if the layers comprising the subterranean strata are largely homogeneous and isotropic, the circular symmetry of the vertical electromagnetic signal can obviate the need to determine the orientation of the detectors within the area of interest. In cases where the layers comprising the subterranean strata are not homogeneous and isotropic, knowledge of the detector antenna orientation, for instance measured by a compass, will allow more thorough data analysis to be performed.

According to a second aspect of the invention, there is provided a method of analysing results from an electromagnetic survey of an area potentially containing a subterranean hydrocarbon reservoir, comprising: providing a first survey data set obtained using a vertical electromagnetic source signal; providing a second survey data set obtained using a horizontal electromagnetic source signal; generating a first normalisation data set specific to the first survey data set; generating a second normalisation data set specific to the second survey data set; combining the first survey data set and first normalisation data set to obtain a first results data set that represents a difference between the first survey data set and the first normalisation data set; and combining the second survey data set and second normalisation data set to obtain a second results data set that represents a difference between the second survey data set and the second normalisation data set.

The survey method distinguishes between the presence of structure within the subterranean strata which influence galvanically coupled electric currents flowing vertically between layers (for example thin resistive layers which can be indicative of the presence of hydrocarbon), and the presence of structures which influence inductively coupled currents flowing horizontally within layers. Differences between the first survey data set and the first normalisation data set reflect structures in the subterranean strata which influence both galvanically and inductively coupled electric currents, whereas differences between the second survey data set and the second normalisation data set reflect the presence only of structures which influence inductively coupled currents. Comparisons between the first and second data sets therefore allow the two classes of structure to be distinguished and hence the presence of thin resistive layers (such as hydrocarbons) to be inferred. Interpretation of the first and second survey data sets may be improved if they are normalised to the respective first and second normalisation data sets or first and second functions specific to the first and second data sets respectively.

The vertical electromagnetic source signal is preferably a vertical electric dipole (VED) electromagnetic signal and the horizontal electromagnetic source signal is preferably a vertical magnetic dipole (VMD) electromagnetic signal. Alternatively, the horizontal electromagnetic source signal could be a magnetotelluric (MT) electromagnetic field signal.

The first results data set may represent the difference between the first survey data set and the first normalisation data set as a function of position within the area and the analysis of the first results data set may include identifying a location of a boundary of the subterranean hydrocarbon reservoir.

The normalisation data sets or functions may be calculated from a rock formation model or from the first and second survey data sets.

According to a third aspect of the invention there is provided a computer program product bearing machine readable instructions for implementing a method of analysing results from an electromagnetic survey as described above.

According to a fourth aspect of the invention there is provided a computer apparatus loaded with machine readable instructions for implementing the method of analysing results from an electromagnetic survey as described above.

According to a fifth aspect of the invention there is provided a method of planning an electromagnetic survey of an area that potentially contains a subterranean hydrocarbon reservoir, comprising: creating a model of the area to be surveyed, including a seafloor, a rock formation containing a hydrocarbon reservoir beneath the seafloor and a body of water above the seafloor; setting values for water depth, depth below the seafloor of the hydrocarbon reservoir, and resistivity structure of the rock formation; performing a simulation of an electromagnetic survey in the model of the survey area by calculating first and second survey data sets for a vertical electromagnetic source signal and a horizontal electromagnetic source signal.

The vertical electromagnetic source signal is preferably a vertical electric dipole (VED) electromagnetic signal and the horizontal electromagnetic source signal is preferably a vertical magnetic dipole (VMD) electromagnetic signal. Alternatively, the horizontal electromagnetic source signal could be a magnetotelluric (MT) electromagnetic field signal.

Repeated simulations for a number of source-to-detector distances and frequencies can be performed in order to allow optimum surveying conditions in terms of source-to-detector distance and frequency of EM signal for probing the hydrocarbon reservoir to be selected when performing an electromagnetic survey. The effects of differing detectors array configurations and source tow paths can also be modelled. The model for the simulation may include a body of air above the body of water, wherein the simulation takes account of signal propagation paths including the body of air when calculating the first and second survey data sets. The first and second survey data sets may be normalised relative to respective first and second normalisation data sets or functions specific to the first and second survey data sets respectively.

According to a sixth aspect of the invention there is provided a computer program product bearing machine readable instructions for implementing the method of planning an electromagnetic survey as described above.

According to a seventh aspect of the invention there is provided a computer apparatus loaded with machine readable instructions for implementing the method of planning an electromagnetic survey as described above.

According to an eighth aspect of the invention there is provided a submersible vehicle for subsea electromagnetic surveying, comprising: a vertical electric dipole antenna; and a vertical magnetic dipole antenna.

The vertical and magnetic electric dipole antennae are preferably mounted such that respective dipole axes thereof are aligned.

In the case that the antennae are driven by signals generated by a power supply in the surface vessel, the submersible vehicle will typically include a waveform generator such as a cycloconverter operable to transform a high voltage, low current AC drive signal received from an umbilical cable into a low voltage, high current AC drive signal to drive the VMD and VED antennae.

According to a ninth aspect of the invention there is provided a survey apparatus comprising: a submersible vehicle according to the eighth aspect of the invention; a signal power supply unit for generating a high voltage, low current AC signal power supply for the submersible vehicle; and an umbilical cable releasably connectable at ends thereof to the signal power supply unit and the submersible vehicle. The survey apparatus can be assembled ready for use by connecting the umbilical cable to the signal power supply unit, which will typically be located on the surface vessel, and the submersible vehicle, which can then be deployed into the sea.

According to a tenth aspect of the invention there is provided a surface vessel carrying a survey apparatus according to the ninth aspect of the invention.

According to an eleventh aspect of the invention there is provided an electromagnetic survey method for surveying an area that potentially contains a subterranean hydrocarbon reservoir, comprising: obtaining a first survey data set using a first electromagnetic field that drives electric current in vertical planes; and obtaining a second survey data set using a second electromagnetic field that drives electric current in horizontal planes.

According to a twelfth aspect of the invention there is provided a method of analysing results from an electromagnetic survey of an area that is thought or known to contain a subterranean hydrocarbon reservoir, comprising: providing a survey data set obtained from a vertical electric dipole (VED) source; generating a normalisation data set specific to the survey data set, wherein the normalisation data set is calculated from a rock formation model; and combining the survey data set and normalisation data set to obtain a results data set that represents a difference between the survey data set and the normalisation data set. In this aspect of the invention, the normalisation data set is of sufficient quality as regards taking account of spatial variation in resistivity (in 1, 2 or 3 dimensions) to obviate the need to compare the VED data with VMD or MT data. The rock formation model preferably includes resistivity, and may be derived from a combination of geological data and resistivity data. The geological data can be from seismological surveying and the resistivity data from well logging. Other sources, such as neutron data could also be used.

According to a thirteenth aspect of the invention there is provided a method of planning an electromagnetic survey of an area that is thought or known to contain a subterranean hydrocarbon reservoir, comprising: creating a model of the area to be surveyed including a seafloor, a rock formation containing a postulated hydrocarbon reservoir beneath the seafloor, and a body of water above the seafloor; setting values for water depth, depth below the seafloor of the postulated hydrocarbon reservoir, and resistivity structure of the rock formation; and performing a simulation of an electromagnetic survey in the model of the survey area by obtaining a survey data set from a simulated vertical electric (VED) dipole source; and adjusting the model to remove the postulated hydrocarbon reservoir and repeating the simulation to obtain a normalisation data set for comparison with the survey data set.

According to a fourteenth aspect of the invention there is provided a method of monitoring an area that contains a subterranean hydrocarbon reservoir by electromagnetic surveying, comprising: obtaining a first VED survey data set of the area; waiting a period of time; obtaining a second VED survey data set; and combining the first and second VED survey data sets to obtain a results data set that represents a difference between the first and second VED survey data sets, said difference being indicative of changes of the reservoir during said period of time.

Optionally, the first and second VED survey data sets can also combined with a normalisation data set. Preferably, each of the first and second VED survey data sets are independently normalised before combining them, typically using the same normalisation data set, although different normalisation sets could be used. It would also be possible to normalise only one of the two data sets. Another possibility would be to obtain the results data set before normalisation and then normalise the combined results data set. In other cases, no normalisation may be necessary. The normalisation data set can be obtained from a survey of the area by a vertical magnetic dipole (VMD) source or obtained from a survey of the area by naturally occurring magnetotelluric (MT) electromagnetic fields or calculated from a rock formation model, for example.

Typically the period of time between VED surveys will be at least a few days and usually of the order of weeks to a few months. For example, the period of time between obtaining VED survey data sets for comparison can be at least a day, a week, or a month.

The method is particularly useful for identifying changes in boundaries of the reservoir during the period of time through analysis of the changes in the VED survey data, for example to monitor reservoir depletion.

BRIEF DESCRIPTION OF THE DRAWINGS

For a better understanding of the invention and to show how the same may be carried into effect reference is now made by way of example to the accompanying drawings.

FIG. 2b shows a vertical electric dipole (VED) antenna and a vertical magnetic dipole (VMD) antenna for use in the EM survey shown in FIG. 2a;

FIG. 7 is a graph schematically showing the normalised field strengths of the vertical, radial and azimuthal components of the electric fields shown in FIGS. 5a and 6a;

FIG. 13b schematically shows in horizontal section the model subterranean strata configuration shown in FIG. 13a.

DETAILED DESCRIPTION

Figure 1A:
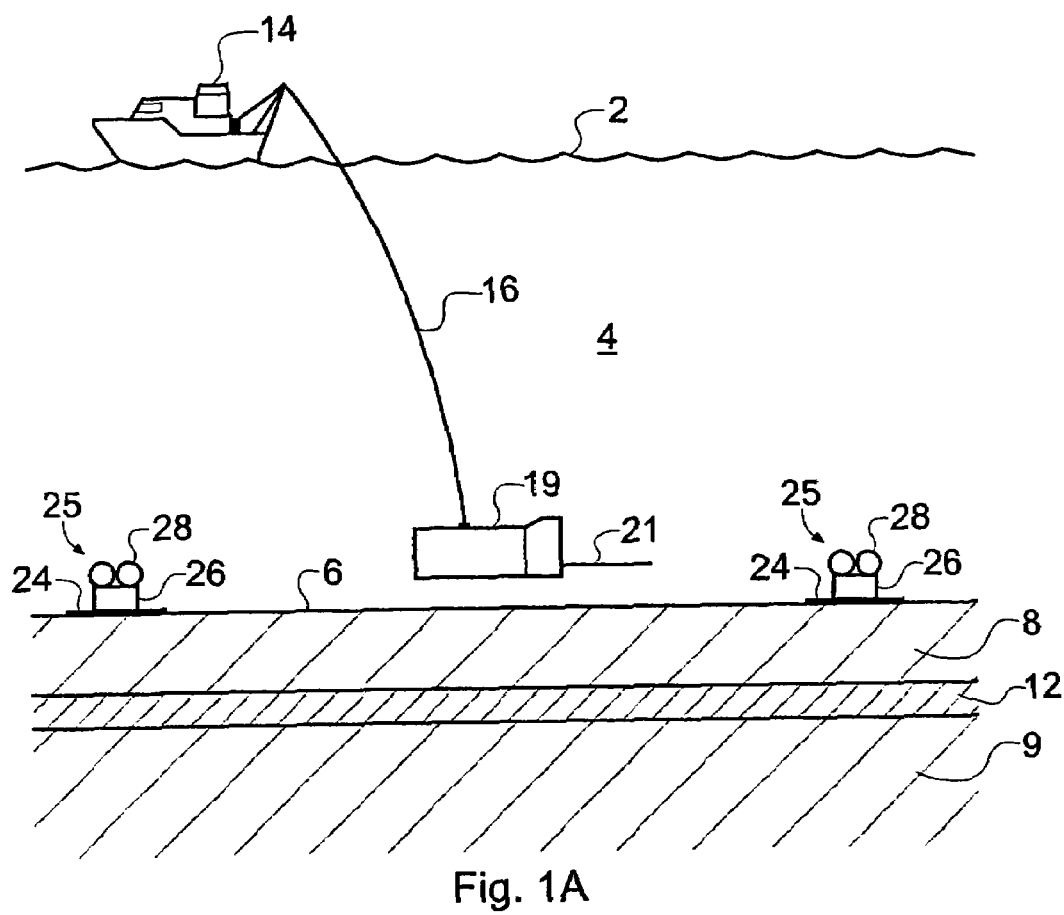
FIG. 1a shows in schematic vertical section a surface vessel undertaking an EM survey according to a previously proposed method.
Figure 2A:
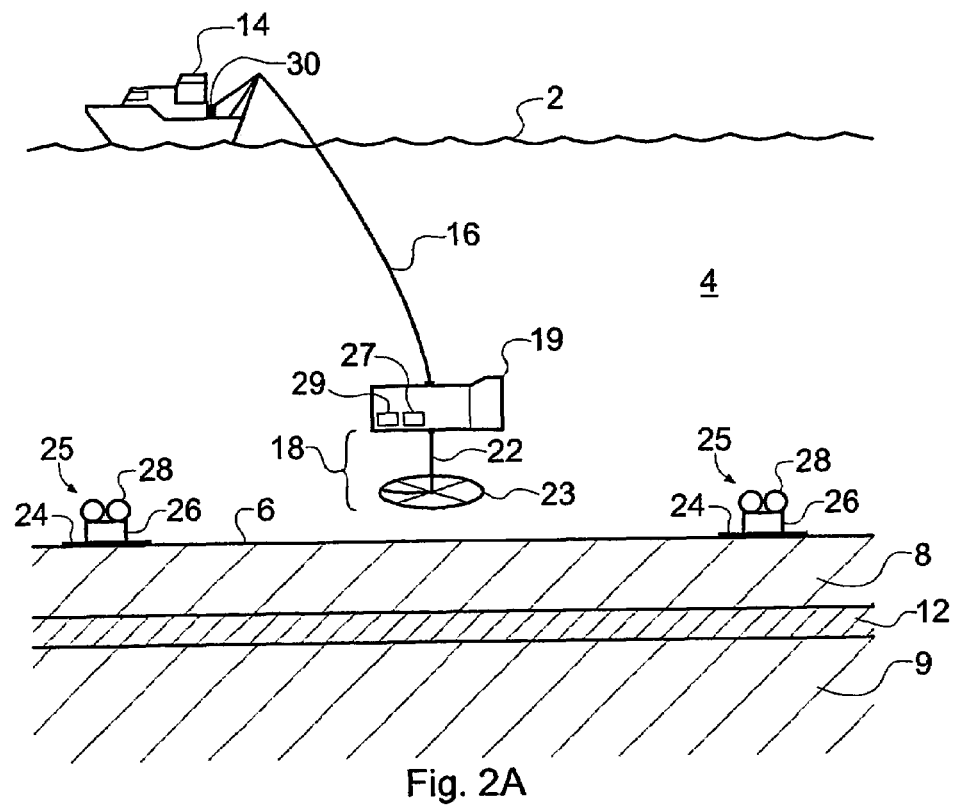
FIG. 2a shows in schematic vertical section a surface vessel undertaking an EM survey according to an embodiment of the invention.

FIG. 2a of the accompanying drawings schematically shows a surface vessel 14 undertaking EM surveying of a subterranean strata configuration (or rock formation) according to an embodiment of the invention. Features shown in FIG. 2a which are functionally similar to features shown in FIG. 1a are given the same reference numeral but shall be described again for the sake of completeness. The subterranean strata configuration includes an overburden layer 8, an underburden layer 9 and a hydrocarbon layer (or reservoir) 12. The surface vessel 14 floats on the surface 2 of the seawater 4. A deep-towed submersible vehicle 19 carrying an EM source 18 is attached to the surface vessel 14 by an umbilical cable 16 providing a detachable electrical and mechanical connection between the deep-towed submersible vehicle 19 and the surface vessel 14. The deep-towed vehicle 19 includes an echo location package 27 which assists in maintaining the EM source 18 at an appropriate height above the seafloor 6. The umbilical cable may be a standard deepwater remotely operated vehicle cable including three high-voltage conductors and three optic fibres. The EM source 18 includes a vertical electric dipole (VED) antenna 22 for broadcasting a first electromagnetic source signal in the form of a VED EM source signal (giving rise to VED EM signals within the seawater and subterranean strata configuration) and a vertical magnetic dipole (VMD) antenna 23 for broadcasting a second electromagnetic source signal in the form of a VMD EM source signal (giving rise to VMD EM signals within the seawater and subterranean strata configuration). The EM source 18 receives electrical power from the ship's on-board power supply via the umbilical cable 16.

A signal power supply unit 30 on the surface vessel 14 provides signal power supplies to a waveform generator in the form of a cycloconverter 29 via the umbilical cable 16. In this example, the cycloconverter 29 is in the deep-towed submersible vehicle. The cycloconverter 29 generates suitable VED and VMD alternating current (AC) drive signals from the signal power supplies and these are supplied to the VED antenna 22 and VMD antenna 23 within the EM source 18. The VED and VMD AC drive signals respectively comprise a first and a second set of frequency components. The AC drive signals drive the VED antenna 22 and VMD antenna 23 to broadcast the VED and VMD EM signals into the seawater 4. In this example, the VED antenna and the VMD antenna are driven (via the cycloconverter) by separate signal power supplies from the signal power supply unit 30. The separate signal power supplies are carried to the cycloconverter 29 on one of the high voltage conductors within the umbilical cable and are returned together on the remaining conductor acting as a common earth. The signal power supply unit 30 is powered from a standard 3-phase power supply on the surface vessel. In other examples, a signal power supply unit may be located within the deep-towed submersible and be supplied via the umbilical cable with a standard 3-phase power supply on the surface vessel. The signal power supply unit generates stable-frequency high-voltage (order 2 kV) AC signal power supplies which are transformed and switched at the deep-towed submersible vehicle by the cycloconverter. The cycloconverter includes a transformer and switching bridge to produce suitable high current VED and VMD AC drive signals to apply to the VED and VMD antennae. By driving the VED and VMD antennae at different frequencies, the VED and VMD EM detector signals can be easily separated. Alternatively only one of the VED and VMD antennae could be driven at any one time, with a routing switch being used to switch between the two antennae, for example at regular intervals of a few minutes.

Another design option is to generate independent VED and VMD signal power supplies from separate signal power supply units housed in the surface vessel, the signal power supplies being supplied separately down a common umbilical cable. The VED and VMD AC drive signals could then be handled by separate cycloconverters (or other waveform generators) in the submersible vehicle 19, thereby providing two independent electrical systems for the two signals.

One or more remote detectors 25 are located on the seafloor 6. Each detector 25 includes an instrument package 26, a detector antenna 24, a floatation device 28 and a ballast weight (not shown). The detector antenna 24 produces a VED detector signal and a VMD detector signal in response to the VED and VMD EM signals in the vicinity of the detector 25 (the terms VED and VMD detector signal are used to indicate which of the VED and VMD EM signals the detector signal corresponds to, and not to reflect the EM field pattern in the vicinity of the detector 25). The instrument package 26 records the VED and VMD detector signals for later analysis. The detector signals may include multiple components of the EM field (both magnetic and electric) in the vicinity of the detector. The detector antenna 24 in this example includes three orthogonal electric dipole detector antennae, a first one arranged vertically for measuring the vertical electric field component of the VED and VMD EM signals at the detector, and second and third orthogonal ones arranged in a horizontal plane for measuring orthogonal horizontal electric field component of the VED and VMD EM signals at the detector. The detector antenna 24 detects (and the instrument package 26 accordingly records) both the amplitude and phase of the electric field arising from the VED and VMD EM signals at the detector 25 resolved along these three orthogonal directions.

Figure 2B:
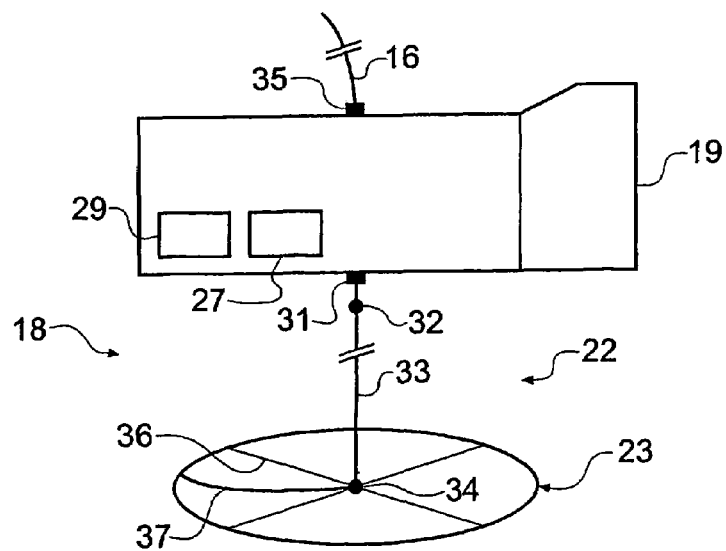

FIG. 2*b* is a schematic perspective view further detailing the EM source 18 and the deep-towed submersible vehicle 19. The deep-towed submersible vehicle is attached to the umbilical cable 16 by a releasable mechanical coupling 35. As noted above, the EM source includes a VED antenna 22 and a VMD antenna 23. The VED antenna is attached to the deep-towed submersible vehicle by a releasable mechanical coupling 31. The VMD antenna is mounted on a support frame 36 which is attached to a lower end of the VED antenna The VED antenna includes an upper VED antenna electrode 32 and a lower VED antenna electrode 34 separated by a VED antenna main body 33. The VED AC drive signal from the cycloconverter is coupled to the VED antenna electrodes 32, 34 via cabling within the deep-towed submersible vehicle and VED antenna main body 33. The conducting seawater 4 presents an unscreened return path for the electrical current comprising the VED AC drive signal and so provides the VED EM source signal. In this example, the VED antenna 22 has a length (i.e. distance between the upper and lower antenna electrodes) of 100 m and is supported such that the lower electrode is maintained by the echo location package 27 at a height of 10 m above the seafloor.

The VMD antenna 23 is a loop antenna and is coupled to the VMD AC drive signal from the cycloconverter via cabling within the deep-towed submersible vehicle, the VED antenna main body 33 and a length of VMD antenna connection cable 37. The VMD antenna may comprise a single loop, but in this example, several conductor turns are employed to provide a larger magnetic dipole moment for a given supply current and loop diameter.

Whilst not shown in this example, a faired cowling may be placed around the VED and/or VMD antenna to reduce drag and help maintain the vertical alignment of the upper and lower electrodes. Stabiliser fins, again not shown in this example, may also be employed to assist in maintaining the stability and orientation of the VED and/or VMD antennae during towing. A short streamer or drogue may also be attached to the VMD to assist towing stability. At low towing speeds (for example <~0.8 ms$^{-1}$ (<~1.5 kts) over the ground) the umbilical 16 between the surface vessel 14 and the mechanical coupling 35 shown in FIG. 2*b* is approximately vertical close to the EM source 18. Nonetheless, standard ultra-short base line acoustic navigation and location methods can be used to determine the position of upper and lower ends of the VED antenna to better than a few meters and any deviation of the VED antenna from vertical can therefore be accounted for in subsequent data processing. It is therefore not essential that the VED antenna induces only vertical current flow loops, although the VED detector signal will be strongest, and the signal data more easily interpretable, if a major component of the current flow induced by the VED antenna is in a vertical plane.

Figures 3A, 3B:
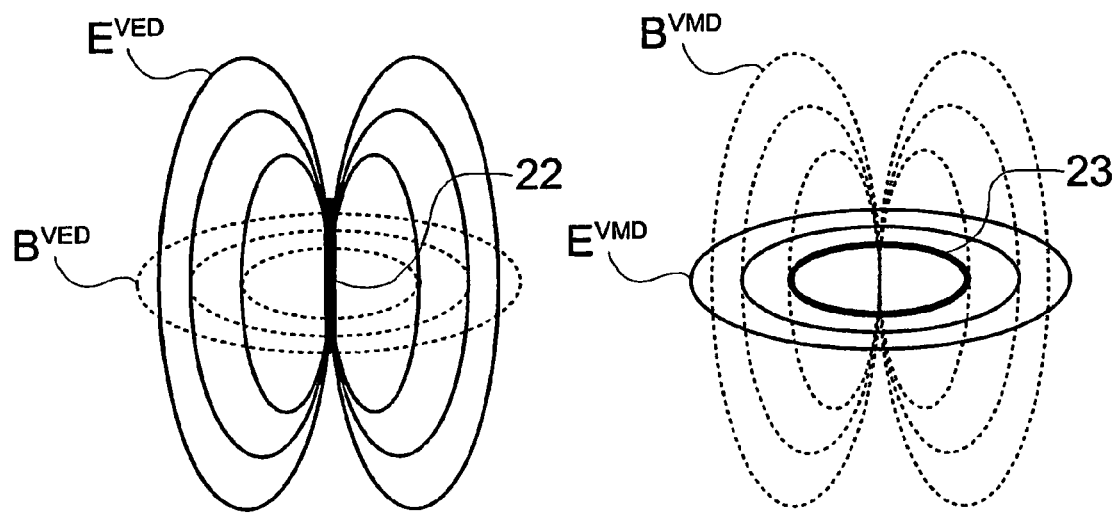
FIG. 3a schematically shows some instantaneous characteristic electric and magnetic field lines associated with a VED antenna.
FIG. 3b schematically shows some instantaneous characteristic electric and magnetic field lines associated with a VMD antenna.

FIG. 3*a* is a schematic diagram showing some instantaneous characteristic electric and magnetic field lines associated with the VED antenna when driven by the VED AC drive signal from the cycloconverter. The electric field is schematically shown by solid lines and marked $E^{VED}$, and the magnetic field is schematically shown by broken lines and marked $B^{VED}$. The electric $E^{VED}$ and magnetic $B^{VED}$ fields are both cylindrically symmetric about the long-axis of the VED antenna 22. The electric field $E^{VED}$ drives current (i.e. has components) only along radial and vertical directions in a cylindrical co-ordinate system centred on and aligned with the dipole antenna 22, there is no azimuthal component of the electric field $E^{VED}$. The magnetic field $B^{VED}$ associated with the VED antenna, on the other hand, has only azimuthal components. Whilst not shown for simplicity, the magnetic field $B^{VED}$ is not confined to the horizontal plane containing the centre of the VED antenna 22. An electromagnetic field configuration of the form shown in FIG. 3a is often referred to as a toroidal magnetic (TM) field configuration.

FIG. 3b is a schematic diagram showing some instantaneous characteristic electric and magnetic field lines associated with the VMD antenna 23 when driven by the VMD AC drive signal from the cycloconverter. The electric field is schematically shown by solid lines and marked $E^{VMD}$, and the magnetic field is schematically shown by broken lines and marked $B^{VMD}$. The electric $E^{VMD}$ and magnetic $B^{VMD}$ fields are both cylindrically symmetric about a vector centred on and perpendicular to the plane of the VMD antenna loop. The electric field $E^{VMD}$ drives current (i.e. has components) only along azimuthal directions in a cylindrical co-ordinate system centred on and perpendicular to the VED antenna loop, there are no radial or vertical components of the electric field $E^{VMD}$, accordingly the VMD EM source signal induces current flow in horizontal planes. The magnetic field $B^{VMD}$ associated with the VMD antenna, on the other hand, has both radial and vertical components, but no azimuthal components. Whilst not shown for simplicity, the electric field $E^{VMD}$ is not confined to the horizontal plane containing VMD antenna 23. An electromagnetic field configuration of the form shown in FIG. 3b is often referred to as a toroidal electric (TE) field configuration.

Since a VED generates only TM mode fields, which are sensitive to the presence of a thin resistive layer, whereas a VMD generates only TE mode fields, which are sensitive to the background structure, by operating the sources at two slightly different frequencies, or consecutively at the same frequency, the two modes can be easily separated, so avoiding the difficulty of the 'mixed-mode' fields generated in previously proposed survey methods.

Whilst the electric field configuration for the VED antenna shown in FIG. 3a includes horizontal radial components in addition to vertical components, it is the vertical components of electric field (which are not present in the electric field configuration for the VMD antenna shown in FIG. 3b) which play a crucial role in the galvanic coupling mechanism. Accordingly, the electric field configuration for the VED antenna is sometimes referred to as a vertical electric field, although it will be understood that the electric field comprises vertical loops which include non-zero radial horizontal components.

During an EM survey, the VED and VMD EM source signals generate VED and VMD EM signals that propagate outwards both into the seawater 4 and downwards through the seafloor 6 and into the subterranean strata 8, 9, 12 comprising the subterranean strata configuration. In each case, at practical frequencies for this method and given the typical resistivity of the media 4, 8, 9, 12, propagation occurs by diffusion of EM fields. The rate of decay in amplitude and the phase shift of the VED and VMD EM signals are controlled both by geometric spreading and by skin depth effects. Because in general the subterranean strata 8, 9, 12 are more resistive than the seawater 4, skin depths in the subterranean strata 8, 9, 12 are longer. As a result, the detector signals seen at the seafloor 6 by the detector 25 (at EM source-detector separations R of greater than a few hundred meters) are dominated by the components of the VED and VMD EM signals which have propagated downwards through the seafloor 6, along within the subterranean strata 8, 9, 12, and back up to the detector 25.

At the end of the EM surveying experiment, a remotely operable release system allows the instrument package 26 to be detached from a ballast weight (not shown) so that an in-built flotation device 28 can carry the instrument package 26 to the surface 2 for recovery and retrieval of data for analysis and interpretation. Both the amplitude and the phase of the detector signals recorded during a survey depend on the resistivity structure of the subterranean strata 8, 9, 12—and so, in principal, a survey consisting of many source (transmitter) and detector (receiver) locations can provide a multi-dimensional image, by geophysical inversion, of subterranean resistivity.

The technique described here exploits the large resistivity contrast that exists between a hydrocarbon reservoir (typically tens of $\Omega$m or higher) and the over- and under-lying sediments (typically ~2 $\Omega$m or less). Such a contrast has a detectable influence on controlled source electromagnetic (CSEM) data collected at the seafloor 6 above the hydrocarbon reservoir 2. The effect of the reservoir is most detectable in CSEM data at an appropriate frequency, and if the horizontal range from the EM source 18 to the detector antenna 24 is of the order of 2 to 5 times the depth of burial of the reservoir 12 in typical situations.

The following text describes specific EM source configurations, geometries and data reduction approaches that allow the effect of a hydrocarbon reservoir on the outcome of a controlled source electromagnetic survey to be detected and analysed in practice.

A Specific Approach to Combining Contrasting Dipole Sources When Prospecting for Hydrocarbon Filled Reservoirs The survey method shown in FIG. 2a exploits the diverse properties of electromagnetic induction outlined above to provide a first survey data set (derived from the VED detector signals) which is sensitive to the presence of thin resistive layers (exploiting the largely galvanic effects associated with vertical components of the induced current flow) while simultaneously obtaining a second survey data set (derived from the VMD detector signals) which is more sensitive to the background sedimentary structure, but relatively insensitive to a thin hydrocarbon layer or reservoir (exploiting the dominantly inductive effects associated with horizontal components of the induced current flow). By collecting both data types potential ambiguities in interpretation can be avoided.

Unlike a single BED source (such as shown in FIG. 1a and discussed above) which excites both the inductive and galvanic current transfer modes simultaneously, the EM source 18 described above excites each mode independently. The VED 22 generates vertical current loops, and excites the galvanically coupled mode whilst the VMD 23 generates horizontal current loops and excites the inductively coupled mode. Since the VED 22 and VMD 23 can be driven independently (either at different times from each other or simultaneously) the effects of the two current transfer modes (i.e. galvanic and inductive) can be easily separated during data analysis.

Figure 4:
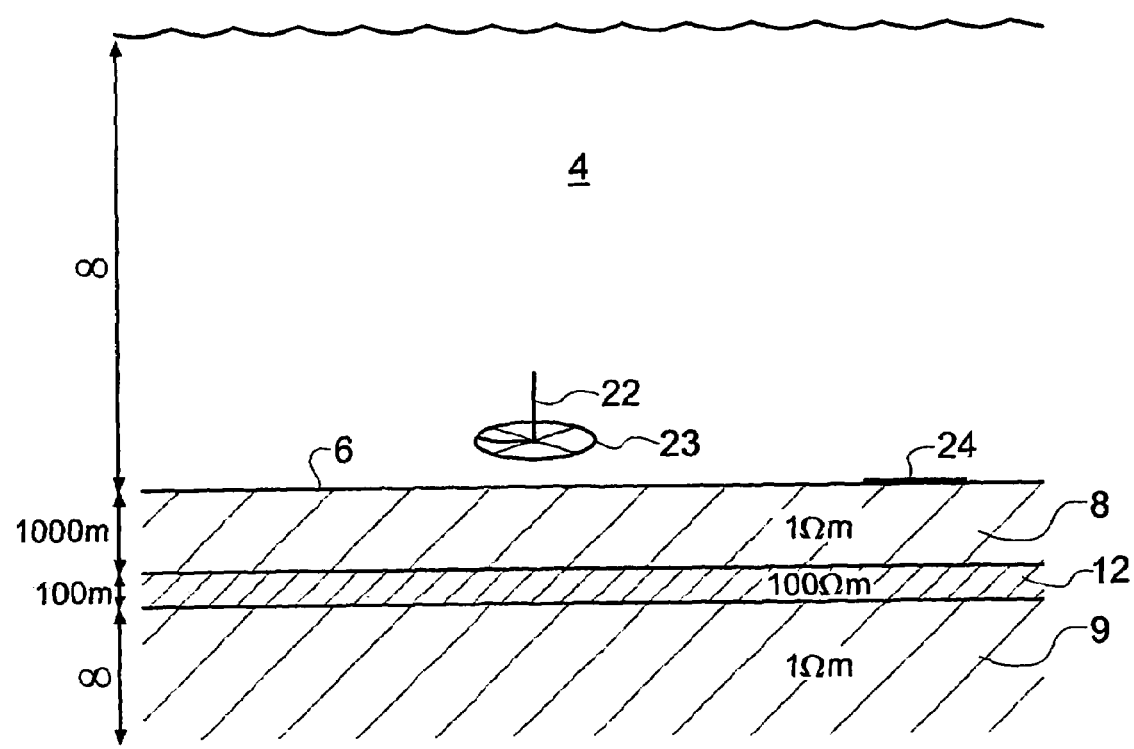
FIG. 4 schematically shows in vertical section a model subterranean strata configuration.

FIG. 4 shows in schematic vertical section a first, or hydrocarbon, model subterranean strata configuration which is used to examine the differing responses of the subterranean strata to the VED and VMD EM signals. A VED antenna 22, a VMD antenna 23 and a detector antenna 24 are shown, other components of the survey equipment previously seen in FIG. 2a are not included for simplicity, but will be understood from the description above. In the hydrocarbon model subterranean strata configuration shown in FIG.

4, a section of seafloor 6 lies beneath an infinite depth of seawater 4 which has resistivity 0.3 Ωm. The subterranean strata beneath the seafloor 6 comprise a 1 km thick overburden layer 8, a 100 m thick hydrocarbon, layer 12, and an infinitely thick underburden layer 9. The overburden layer 8 and the underburden layer 9 have relatively low resistivities, in this example 1 Ωm, due to aqueous saturation of pore spaces. The hydrocarbon reservoir 12 has a relatively high resistivity, in this example 100 Ωm, due to the presence of the poorly-conducting hydrocarbon occupying much of the pore spaces.

Figure 5A:
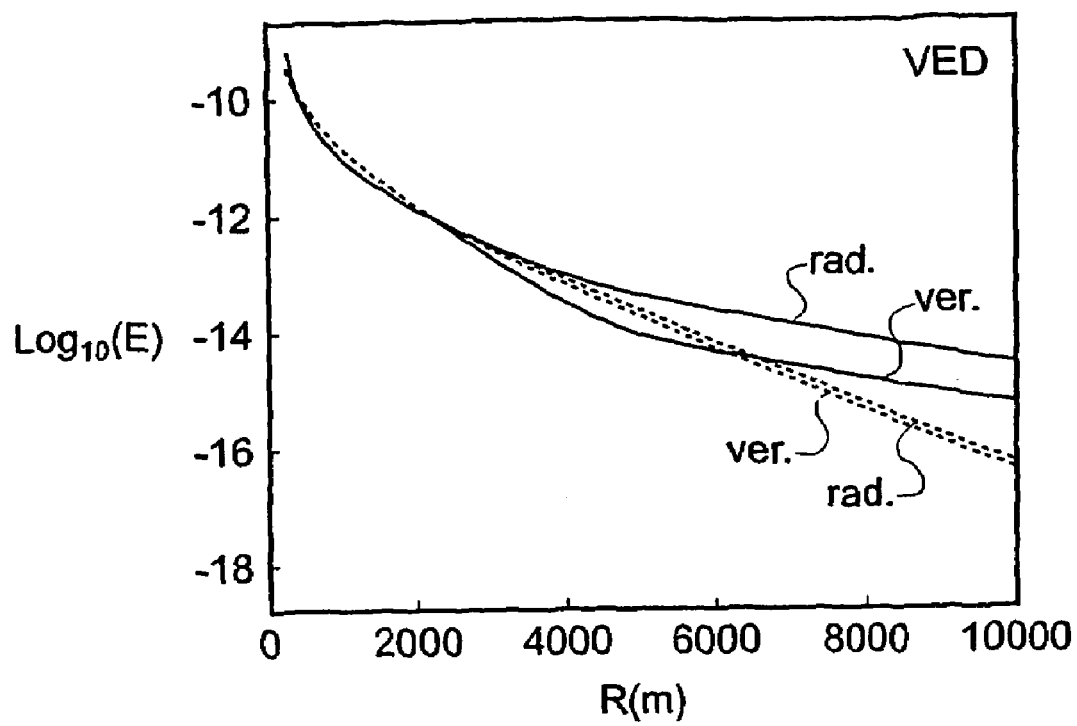
FIG. 5a is a graph schematically showing the strength of the vertical and radial components of electric field seen at a detector in response to a VED EM signal for two different subterranean strata configurations.

FIG. 5a is a graph schematically showing the logarithm of the modelled radial and vertical electric field component amplitudes, $Log_{10}(E)$, seen by a detector in response to a VED EM source signal as a function of separation, or range, R, between the VED antenna and the detector. In this example, the VED AC drive signal is a quasi-square wave at a frequency of 0.25 Hz and the electric fields are calculated per unit source electric dipole moment. The VED antenna is 100 m long and supported such that the lower electrode is 10 m above the seafloor. The model field strengths are shown both for the hydrocarbon model strata configuration shown in FIG. 4 (solid lines) and for a second, or normalising, model subterranean strata configuration (dashed lines). The normalising model subterranean strata configuration is similar to the hydrocarbon model subterranean strata configuration seen in FIG. 4, but without the hydrocarbon layer (i.e. a continuous infinite half-space of resistivity 1 Ωm beneath an innite depth of seawater with resistivity 0.3 Ωm). In each case, the curves relating to the vertical and radial components of the detected field are marked as ver and rad respectively.

Figure 5B:
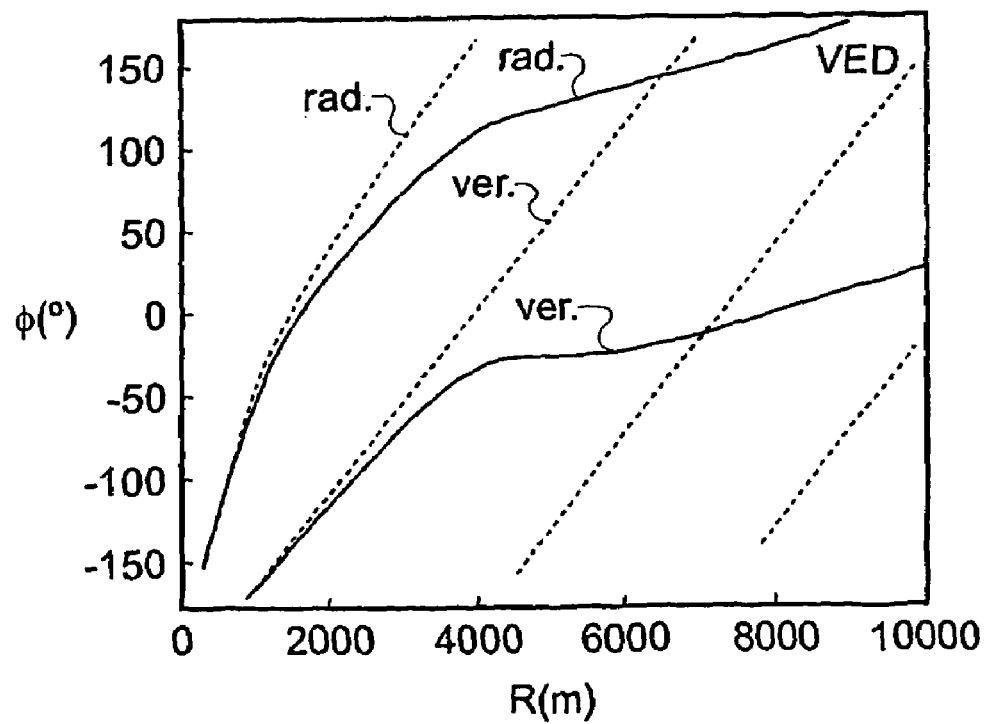
FIG. 5b is a graph schematically showing the phase of the vertical and radial components of electric field seen at a detector in response to a VED EM signal for two different subterranean strata configurations.

FIG. 5b is a graph schematically showing the phase, φ, relative to the VED AC drive signal used to drive the VED antenna, of the modelled radial and vertical electric field components plotted in FIG. 5a. Again, curves are shown both for the hydrocarbon (solid lines) and the normalising (dashed lines) model subterranean strata configurations and marked ver and rad for the vertical and radial electric field components in the VEM detector signal as appropriate.

It can be seen from FIG. 5a that at short ranges (<~2000 m) the modelled radial electric fields for the hydrocarbon model subterranean strata configuration show a reduction in magnitude relative to the response of the uniform half-space normalising model subterranean strata configuration. This is caused by the interruption of current flow by the resistive hydrocarbon layer. At longer ranges however, the modelled radial electric field strength within the hydrocarbon model subterranean strata configuration is enhanced relative to the response of the normalising model subterranean strata configuration. This effect is characteristic in the galvanically coupled mode of a structure in which the resistivity first increases and then decreases with depth below the seafloor. The vertical electric field components at the seafloor show a similar pattern, although the decrease in the magnitude of the fields at shorter ranges is more pronounced and extends to around 6000 m. This is because of the dependence of the vertical fields on the vertical component of current flow.

It can be seen from FIG. 5b that the phase of the detected signals is also strongly dependent on the presence of the hydrocarbon reservoir. For example, beyond about 4000 m, the rate of change of phase with increasing separation is significantly lower for both the radial and vertical electric field components in the hydrocarbon model subterranean strata configuration (solid lines) compared to the normalising model subterranean strata configuration (dashed lines).

Figure 6A:
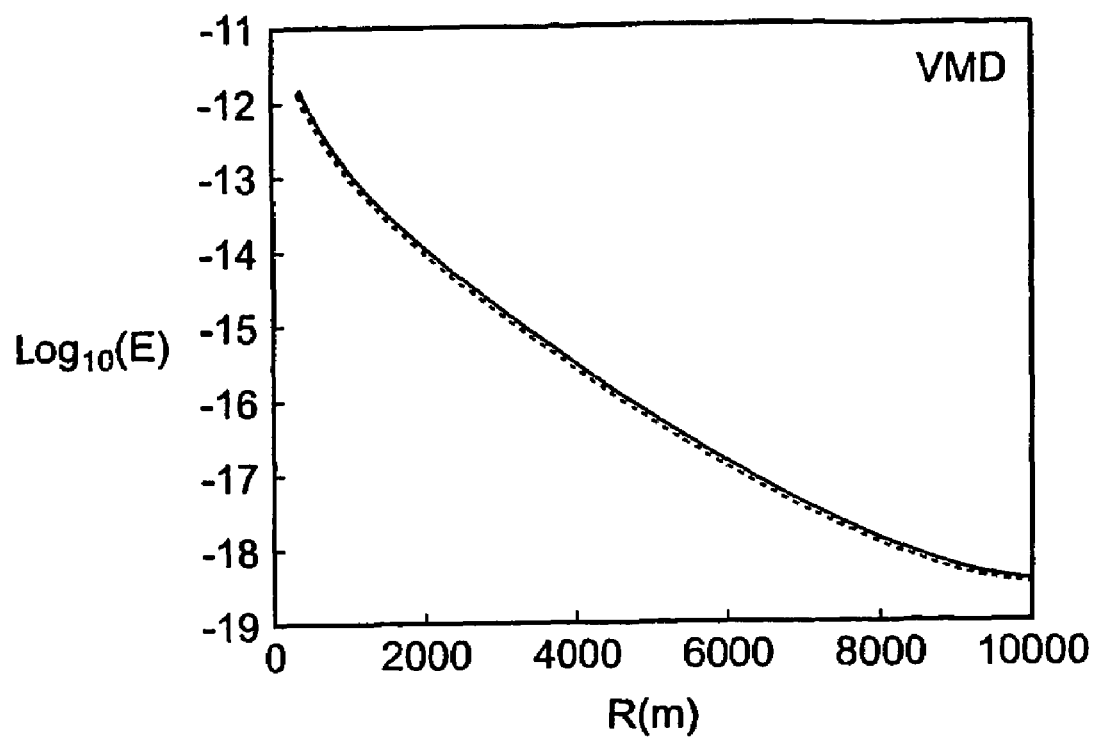
FIG. 6a is a graph schematically showing the strength of the azimuthal component of electric field seen at a detector in response to a VMD EM signal for two different subterranean strata configurations.

FIG. 6a is a graph schematically showing the logarithm of the modelled azimuthal electric field component amplitude, $Log_{10}(E)$, seen by a detector in response to a VMD EM source signal as a function of separation, or range, R, between the VMD antenna and the detector. In this example, the VMD AC drive signal is a quasi-square wave at a frequency of 0.25 Hz and the electric fields are calculated per unit source magnetic dipole moment. The VMD antenna is supported 10 m above the seafloor. The modelled field strength is again shown for both the hydrocarbon (solid lines) and the normalising (dashed lines) model subterranean strata configurations discussed above.

Figure 6B:
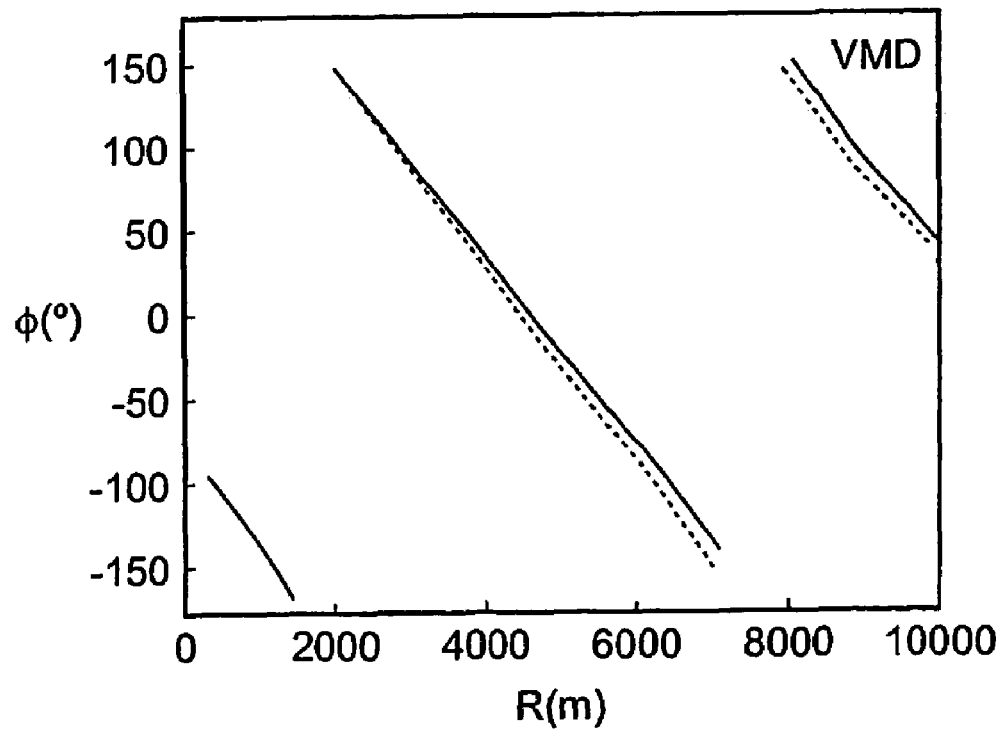
FIG. 6b is a graph schematically showing the phase of the azimuthal component of electric field,seen at a detector in response to a VMD EM signal for two different subterranean strata configurations.

FIG. 6b is a graph schematically showing the phase, φ, relative to the VMD AC drive signal used to drive the VMD antenna, of the modelled azimuthal electric field components plotted in FIG. 6a. Again, curves are shown for both the hydrocarbon (solid lines) and the normalising (dashed lines) model subterranean strata configurations.

It can be seen from FIGS. 6a and 6b that the modelled field strength and the modelled phase are very similar for both the hydrocarbon and the normalising model subterranean strata configurations. The hydrocarbon layer has little effect on either of the magnitude or phase of the azimuthal detector signal seen in response to the VMD EM signal (which induces horizontal current flows).

As can be seen in FIGS. 5a and 6a, the modelled electric field component amplitudes drop rapidly with increasing source-detector separation R. In a typical EM survey the detector signal amplitude is therefore likely to vary by several orders of magnitude over a useful range of source-detector separations. The phase φ of the detector signal increases steadily with increasing separation. In order to visualise more clearly the effects of a subterranean strata configuration on the detector signal during a survey, it is convenient to normalise the VED and VMD detector signals to first and second normalisation data sets respectively. The first and second normalisation data sets may reflect calculated detector signals for model subterranean strata configurations or functions specific to the VED and VMD EM source signals respectively. For example, one simple reference model to use would be the normalising model subterranean strata configuration described above. In other examples it may be preferred to use different models, for example, one similar to the normalising model subterranean strata configuration but including the true (rather than infinite) depth of seawater at the survey site. If appropriate, and if the relevant a priori information is available, a more complex reference model may be used, although it is generally desirable to use the simplest reference model that can broadly represent the large scale background properties of the subterranean strata.

Figure 7:
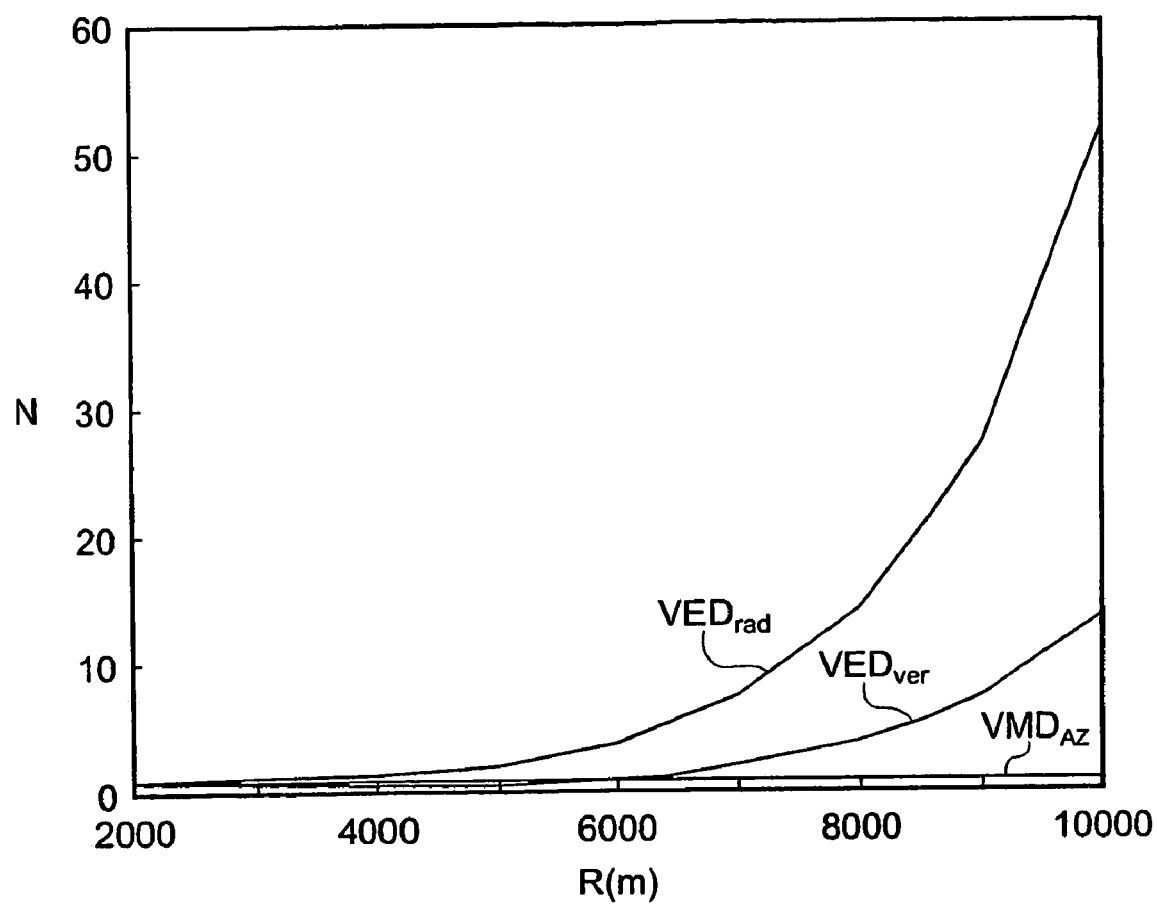

FIG. 7 is a graph schematically showing the same electric field strengths plotted in FIGS. 5a and 6a for the hydrocarbon model subterranean strata configuration but after normalisation by the normalising model subterranean strata configuration. The normalised field strengths N are marked $VED_{ver}$ and $VED_{rad}$ for the vertical and radial electric fields seen in response to a VED EM source signal (solid lines in FIG. 5a) and $VMD_{az}$ for the azimuthal field seen in response to a VMD EM source signal (solid line in FIG. 6a). The normalisation is carried out by dividing the electric fields comprising the detector signals calculated for the hydrocarbon model subterranean strata configuration by those calculated for the normalising model subterranean strata configuration with the same source-detector geometry. Whilst not shown, in the case of the phase data, normalisation is carried out by subtracting the phase calculated for the normalising model subterranean strata configuration model from that of the hydrocarbon model subterranean strata configuration.

As an alternative, normalisation could be based on the survey data itself, for example using data collected adjacent to the target or applying a smoothing algorithm, such as a box-car mean or a low-frequency spatial filter, to the first and second data sets.

As with FIG. 5a, it can be seen from FIG. 7 that the presence of the hydrocarbon layer leads to increased radial and vertical electric field strengths seen at a detector in response to a VED EM signal beyond around 4000 m (radial) and 6000 m (vertical). For example, at around 8000 m the radial and vertical components are enhanced by factors of around 15 and 5 respectively. As with FIG. 6a, it can also be seen from FIG. 7 that the presence of the hydrocarbon layer has little effect on the azimuthal electric field strengths seen by a detector in response to a VMD EM signal. This is apparent since the normalised electric field amplitude is close to unity for all source-detector separations.

Even though the VMD detector signals are not strongly affected by the presence of the hydrocarbon layer, observing the response of a subterranean strata to horizontally induced current flow is an important part of the method since, as noted above and explained further below, characterising the background structure in this way helps to resolve possible ambiguities in the interpretation of VED detector signal data alone. This is especially useful in areas of exploration where the background structure is not well understood.

Figure 8:
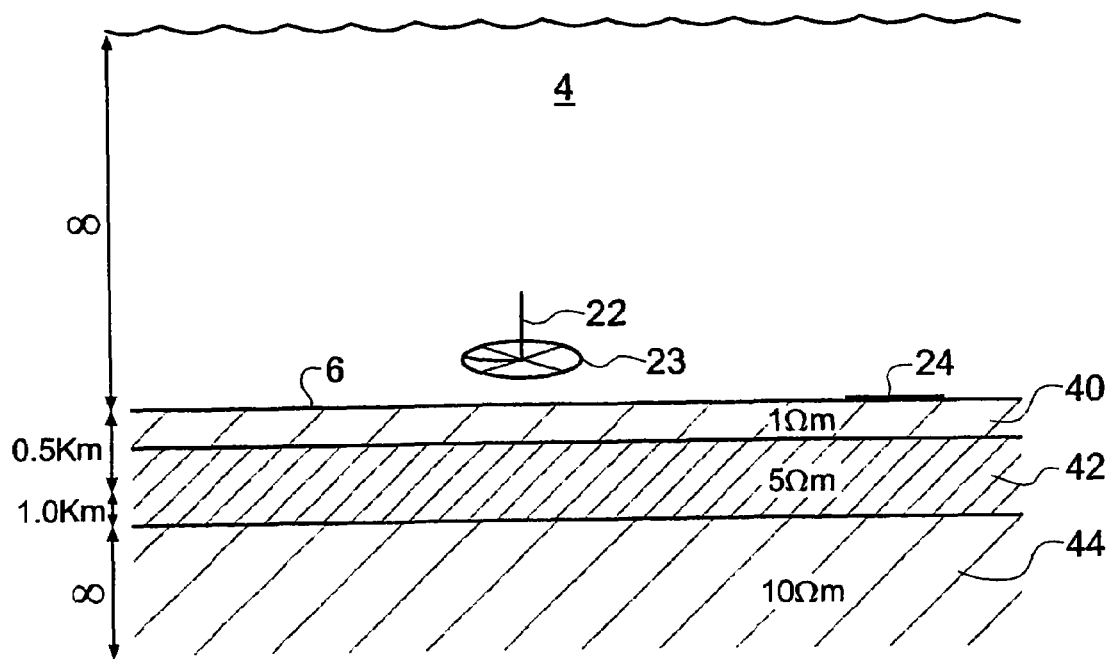
FIG. 8 schematically shows in vertical section another model subterranean strata configuration.

FIG. 8 shows in schematic vertical section a third, or increasing-resistivity, model subterranean strata configuration used to highlight some of the ambiguities which may arise if only VED detector signal data are collected. A VED antenna 22, a VMD antenna 23 and a detector antenna 24 are shown. As with the hydrocarbon model subterranean strata configuration, the increasing-resistivity model subterranean strata configuration shown in FIG. 9 includes a section of seafloor 6 beneath an infinite depth of seawater 4 which has resistivity 0.3 Ωm. In the increasing-resistivity model subterranean strata configuration, the strata beneath the seafloor 6 comprise a 500 m thick first layer 40 with resistivity 1 Ωm, a 1 km thick second layer 42 with resistivity 5 Ωm and an infinitely thick third layer 44 with resistivity 10 Ωm. The increasing-resistivity model subterranean strata configuration approximates to a subterranean strata configuration displaying a steadily increasing resistivity with depth. This is not an unreasonable feature of submarine sedimentary basins due to the progressive expulsion of conductive pore fluids with increasing depths by a rising overburden pressure.

Figure 9A:
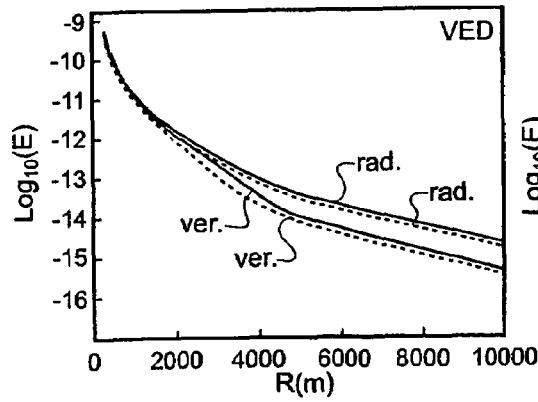
FIG. 9a is a graph schematically showing the strength of the vertical and radial components of electric field seen at a detector in response to a VED EM signal for two different subterranean strata configurations.

FIG. 9a is a graph schematically showing the logarithm of the modelled radial and vertical electric field component amplitudes, $Log_{10}(E)$, seen by a detector in response to a VED EM source signal as a function of separation, or range, R, between the VED antenna and the detector. In this example, the VED AC drive signal is a quasi-square wave at a frequency of 0.25 Hz and the electric fields are calculated per unit source electric dipole moment. The VED antenna is 100 m long and supported such that the lower electrode is 10 m above the seafloor. The model field strengths are shown both for the hydrocarbon model strata configuration shown in FIG. 4 (solid lines) and for the increasing-resistivity model subterranean strata configuration shown in FIG. 8 (dashed lines). In each case, the curves relating to the vertical and radial components of the detected field are again marked as ver and rad respectively.

Figure 9B:
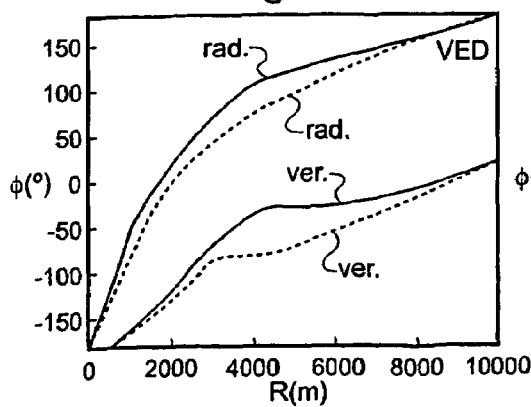
FIG. 9b is a graph schematically showing the phase of the vertical and radial components of electric field seen at a detector in response to a VED EM signal for two different subterranean strata configurations.

FIG. 9b is a graph schematically showing the phase, $\phi$, relative to the VED AC drive signal used to drive the VED antenna, of the modelled radial and vertical electric field components plotted in FIG. 9a. Again, curves are shown both for the hydrocarbon (solid lines) and the increasing-resistivity (dashed lines) model subterranean strata configurations and marked ver and rad for the vertical and radial electric field components of the VED detector signal as appropriate.

It can be seen from FIGS. 9a and 9b that the VED detector signals (both radial and vertical) are similar in amplitude and phase for both the hydrocarbon and the increasing-resistivity model subterranean strata configurations. Accordingly, whilst the presence of a hydrocarbon layer within an otherwise uniform subterranean strata configuration can be identified by observing the response of the subterranean strata to a VED EM source signal (as shown by the curves in FIGS. 5a and 5b), it can be difficult to distinguish between a hydrocarbon layer within an otherwise uniform subterranean strata configuration and a non-hydrocarbon-containing subterranean strata configuration displaying an increasing resistivity with depth such as is associated with some submarine sedimentary basins.

Figure 10A:
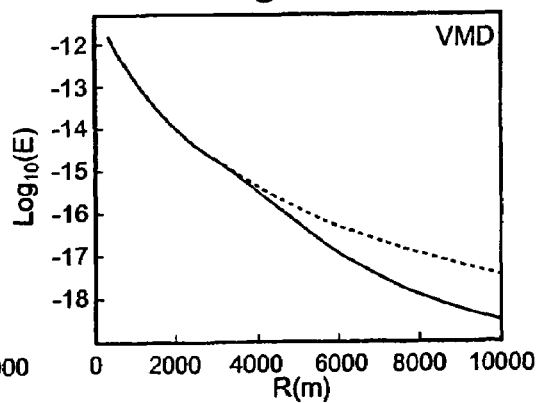
FIG. 10a is a graph schematically showing the strength of the azimuthal component of electric field seen at a detector in response to a VMD EM signal for two different subterranean strata configurations.

FIG. 10a is a graph schematically showing the logarithm of the modelled azimuthal electric field component amplitude, $Log_{10}(E)$, seen by a detector in response to a VMD EM source signal as a function of separation, or range, R, between the VMD antenna and the detector. In this example, the VMD AC drive signal is a quasi-square wave at a frequency of 0.25 Hz and the electric fields are calculated per unit source magnetic dipole moment. The VMD antenna is supported 10 m above the seafloor. As with FIG. 9a, the modelled field strength is shown for both the hydrocarbon (solid line) and the increasing-resistivity (dashed line) model subterranean strata configurations.

Figure 10B:
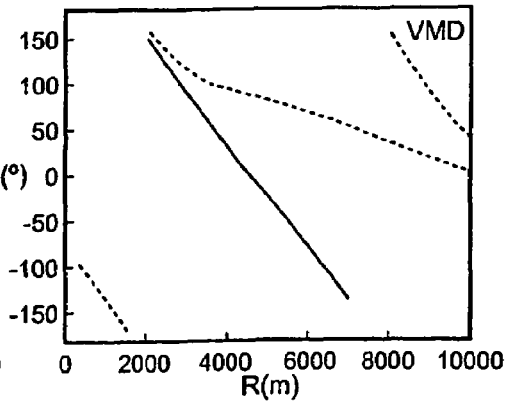
FIG. 10b is a graph schematically showing the phase of the azimuthal component of electric field seen at a detector in response to a VMD EM signal for two different subterranean strata configurations.

FIG. 10b is a graph schematically showing the phase, $\phi$, relative to the VMD AC drive signal used to drive the VMD antenna, of the modelled azimuthal electric field components plotted in FIG. 10a. Again, curves are shown for both the hydrocarbon (solid line) and the increasing-resistivity (dashed line) model subterranean strata configurations.

It can be seen from FIG. 10a that the detected azimuthal electric field amplitude seen in response to a VMD EM source signal for the hydrocarbon and the increasing-resistivity model subterranean strata configurations beyond a source-detector separation R of about 4000 m begin to differ. This allows the ambiguity between the two models in response to VED EM source signals alone to be resolved.

In summary, the VED detector signals can be used to distinguish between a structured subterranean strata configuration (e.g. as shown in FIGS. 4 and 7) and a non-structured subterranean strata configuration (e.g. the uniform model subterranean strata configuration described above) and the VMD detector signals can be used to distinguish between different structured subterranean strata configurations to identify the presence of a hydrocarbon layer or reservoir.

Whilst in the above example a VMD EM signal is employed to determine the response of the subterranean strata configuration to horizontally induced currents, similar information on background structure could be gathered using marine magnetotelluric (MT) data [12]. As noted above, the ionospheric EM fields used as the source in MT sounding excite predominantly horizontal current flow in the earth. MT data are therefore notoriously insensitive to thin resistive layers, however they can be used to determine the background structure [7]. It is likely that in many circumstances VMD detector signal data of the type discussed above will be preferred since marine MT data are rarely collected at frequencies high enough to resolve structure at the same scale allowed when using controlled source VMD EM source signals. Furthermore, the effect of distant coastlines can often be seen in MT data and this can increase the complexity of the interpretation even if the local structure is simple. A further advantage of employing controlled source VMD EM source signals in addition to controlled source VED EM source signals is that provided the VMD antenna is driven at a similar frequency as the VED antenna, the VMD EM signals provide information about background structure at the same scale as that resolved with the VED EM signals.

Use of a Mobile Source and Multiple Fixed Detectors

In order to perform a thorough survey over a large area, and to provide curves similar to those shown in FIGS. 5a, 5b, 6a, 6b, 8a, 8b, 9a and 9b, controlled source electromagnetic measurements will typically be made with many EM source and detector locations. Whilst these could be made in parallel using a plurality of EM sources operating at different frequencies and a plurality of detectors, or in series using a single EM source and a single detector which are repositioned between measurements, it will generally be more efficient to employ a plurality of detectors in fixed positions and a single repositionable EM source, as indicated in FIG. 2a.

The EM source 18 shown in FIG. 2a can require significant power to drive it, of the order tens of kilowatts, or greater for signals detectable at ranges of several kilometres. The umbilical cable 16 connecting the EM source 18 to the survey vessel 14 supplies this power and makes it relatively straightforward to make the EM source mobile. It can then be towed in an appropriate survey pattern by the surface survey vessel 14. Since in many situations surveys of this kind are liable to take place over areas of the seafloor 6 where sensitive engineering installations exist or are planned, there are significant advantages to using a source which does not physically come into contact with the seafloor 6. Provided that the separation between the EM source 18 and the seafloor 6 is small compared to a skin depth of the investigating field in seawater, the survey can still be completed. (Although it is noted that coupling of the VED EM signal into the subterranean strata is weaker than that of a HED [13]).

Figure 11:
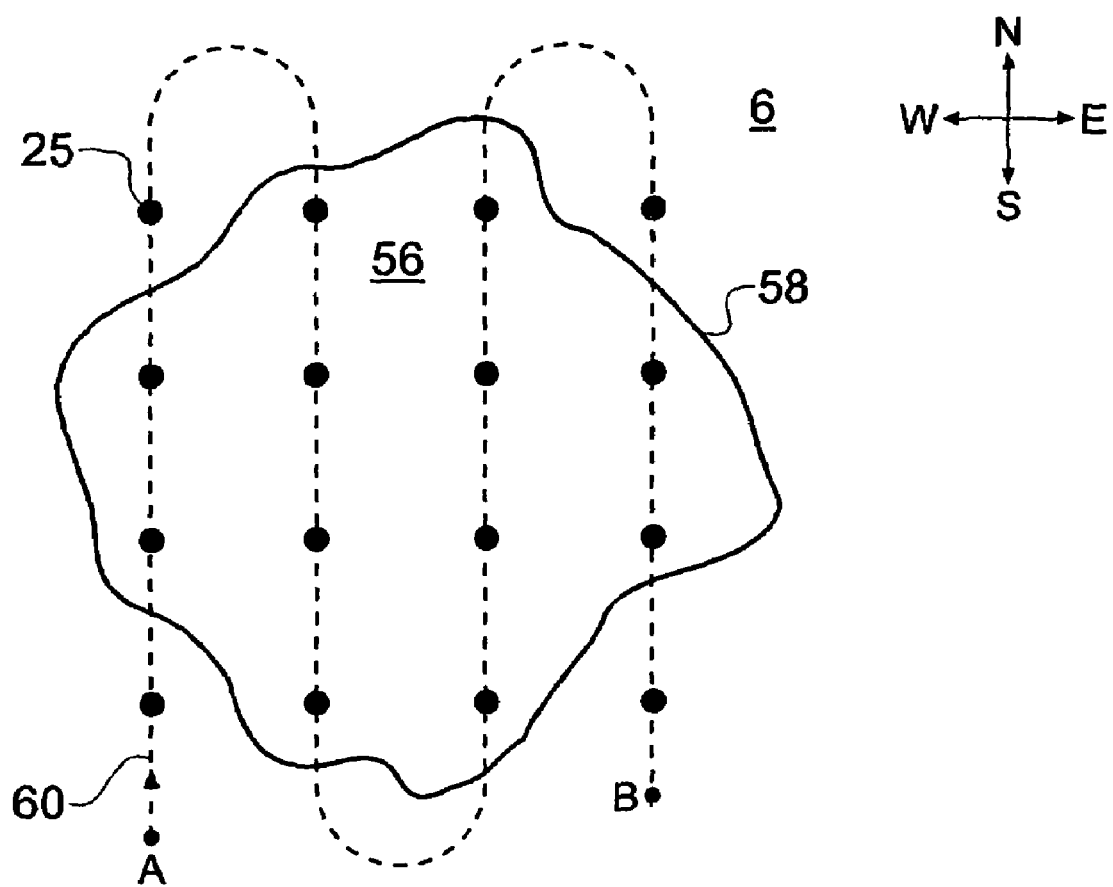
FIG. 11 is a schematic plan view showing an arrangement of sixteen detectors on a section of seafloor above a subterranean reservoir, an example EM source tow path is also shown.

FIG. 11 is a schematic plan view showing an example layout of sixteen detectors 25 distributed across a section of seafloor 6 above subterranean reservoir 56. The reservoir 56 has a linear extent on the order of several km and its boundary is indicated by a heavy line 58. The orientation of the subterranean reservoir is indicated by the cardinal compass points (marked N, E, S and W for North, East, South and West respectively) indicated in the upper right of the figure. In this example, the detectors 25 are uniformly distributed in a square-grid pattern so as to approximately cover the reservoir 56. In performing a survey, an EM source (not shown) starts from the location marked 'A' in FIG. 11 and is towed, whilst broadcasting continuously as described above, along a path indicated by the broken line 60, the survey is completed when the source reaches the location marked 'B'. VED and VMD detector signal data are continuously collected by the detectors 25 throughout the towing process and the position of the EM source relative to the network of detectors is also logged.

During the towing process, each of the detectors 25 presents several different source-detector separations and orientations relative to the EM source. Accordingly, by following the tow path marked, EM survey detector signal data are collected for many different source-detector separations along many different directions. These detector signal data can be inverted to provide a thorough map of the subterranean strata configuration using appropriate geophysical inversion techniques. In this way a simple continuous towing of the source can provide a detailed survey which covers the extent of the subterranean reservoir 56.

Figure 1B:
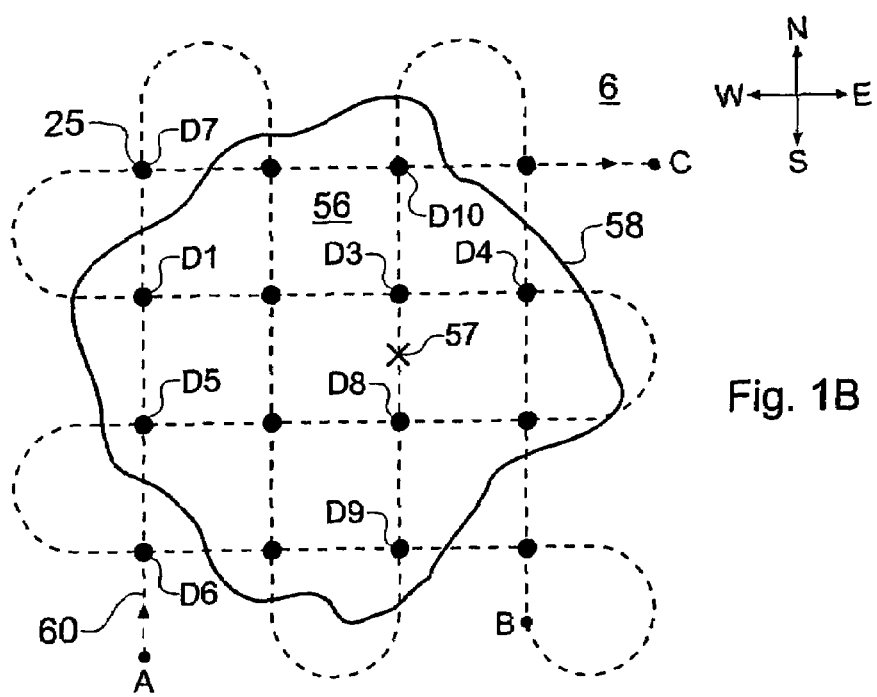
FIG. 1b is a schematic plan view showing an example survey geometry according to the previously proposed method in which sixteen detectors are laid out on a section of seafloor above a subterranean reservoir.

FIG. 1b shows for comparison an example tow path followed by a previously proposed survey geometry using a HED antenna in an electromagnetic survey of the same area as shown in FIG. 11. Features of FIG. 1b similar to those shown in FIG. 11 will be understood from the above. However, in this example, the tow path is longer. Whilst again stating at the location marked 'A', the tow path shown in FIG. 1b is approximately twice as long, ending at the location marked 'C', as that shown in FIG. 11. When performing an EM survey according to the present invention, detector signal data can be collected from all detectors when the EM source is at all points along the tow path shown in FIG. 11, irrespective of orientation.

However, the geometric requirements of a HED antenna survey are such that at any point during the survey, data can only be reliably collected from those detectors to which the HED antenna is arranged either in-line or broadside, as described further above. Accordingly, with a HED antenna survey, not only is a longer tow path required for a given area of interest but much less data can be usefully collected along this path. It is also clear that broadside and in-line data which are to be analysed together (i.e. relating to the same source and detector locations) cannot be collected simultaneously.

Although the above example is based on a square detector grid, it will be understood that a wide variety of detector placements may be used. For example other high symmetry regular grids, such as triangular or rectangular, may be used. In addition irregular grids may be used that have no high level of symmetry.

In the case of the detectors, there are further advantages in using static devices. Firstly, since detectors suitable for the EM surveying are generally internally powered and relatively cheap compared to a suitable EM source, a plurality of detectors can easily by arrayed around an area of interest so as to provide multiple source-detector ranges and positions for a single EM source position as shown in FIG. 11. Secondly, the task of the detectors is to measure electric or magnetic components of the VED and VMD EM signals at the seafloor 6. In typical applications, the signal-to-noise ratio of the VED and VMD detector signals is important to the success and resolution of the survey, and should be maximised. Moving a detector inevitably generates noise, whether the field components comprising the detector signals are magnetic or electric. In the case of electric fields, any motion of the detector through the conducting seawater 4 in the presence of earth's geomagnetic field generates an electromotive force across the detector antenna 24. Detector movements will therefore map into spurious detector signals in the recorded data. In the case of magnetic field recordings, there are also advantages to having a static detector. Most importantly, if vector rather than scalar magnetometers are used (i.e. measuring individual directional components of the magnetic field), any variation in the orientation of the detector antenna 24 will again lead to significant spurious detector signals, since the magnetic detecting element will detect changes in the component of the geomagnetic field aligned with it. As a consequence of these effects, any translational movement of an electric field sensor comprising the detector antenna 24 or rotational movement of a magnetic field sensor comprising the detector antenna 24 will result in contamination of the detector signals by motionally induced noise.

For these reasons it is desirable to carry out a controlled source electromagnetic survey to investigate or detect the presence of buried hydrocarbons using a combination of a mobile EM source operated just above the seafloor 6 and an array of electric and/or magnetic field sensors comprising the detector antenna 24 placed statically on the seafloor 6 as indicated in FIG. 11. At the end of an EM survey, the instrument packages associated with the detectors are recovered using an acoustically actuated release mechanism to separate it from the ballast weight, allowing them to return to the sea surface for recovery, following standard oceanographic and marine geophysical practice.

Source and detector positions can be determined using standard long and/or short and/or ultra-short baseline acoustic navigation systems and processed to determine the separation between the source and detector. With traditional HED antennae, the relative orientation of a source and a detector must also be determined since HED detector signals depend critically on the relative geometry. This can be a substantial source of error when surveying with HED antennae. However, since the fields of both a VED antenna and VMD antenna are cylindrically symmetric around the source (see FIGS. 3a and 3b) only the source-detector separation is required meaning that geometric errors are reduced compared to those encountered using a traditional HED antenna.

Furthermore, when using a towed HED antenna, both in-line and broadside geometries are required in order to unambiguously determine the subterranean strata resistivity structure. Although in-line data are straightforward to collect, ensuring the same coverage in the broadside data requires significantly more survey time since, as noted above, data can only be reliable collected with the HED antenna positioned at certain discrete positions (or survey locations) relative to a detector array and the HED antenna must also make multiple passes at each of these positions. An advantage of using a VED antenna and a VMD antenna is that detector signals resulting form the both the inductively coupled mode and the galvanically coupled mode can be collected continuously and simultaneously at each detector during towing, for example by driving the VED and VMD antennae at different frequencies. In some circumstances (for instance where the subterranean strata comprise substantially isotropic and homogeneous layers), it can be possible to separate VED and VMD detector signals collected simultaneously even with VED and VMD antennae being driven at the same frequency. For example, and considering only electric field detector signal components in a horizontal plane, this can be achieved by resolving the detector signal along radial and azimuthal directions. As noted above, the VED and the VMD antennae give rise to only radial and azimuthal electric fields respectively and so the azimuthal and radial components relate independently to the VED and VMD EM signals. However, if the subterranean strata does not comprise substantially isotropic and homogeneous layers then refraction can lead to mixing of the signals from the VED and VMD antennae.

It is noted that if the subterranean strata does comprise substantially isotropic and homogeneous layers, and in the case that the VED and the VMD antennae are driven at different frequencies, the resultant of the electric field amplitude measured in the two orthogonal horizontal directions of the detector antenna at each frequency reflects the radial and azimuthal components (and hence response of the subterranean strata to the VED and VMD EM signal respectively) regardless of the orientation of the detector antenna. However, in general the subterranean strata will not comprise substantially isotropic and homogeneous layers and knowledge of the detector antenna orientation, for instance measured by a compass, will allow more thorough data analysis to be performed.

This means that a 2D section of the subterranean strata can be determined with relatively few detectors and EM source tows, so reducing the time taken, and hence cost, for an exploratory EM survey. If a full 3D map of the subterranean strata is required, the relative simplicity of the electric and magnetic field geometries associated with VED and VMD antennae means that an image of a target structure can be built up much more straightforwardly than using data from existing HED antenna systems.

It will be understood that whilst the above description describes a towed VED antenna, the method would also be applicable in a fixed installation. For example, the method could be used to monitor changes a hydrocarbon reservoir from which hydrocarbon is being drawn. In such cases it will be appropriate to employ one (or more) VED antenna(e) in fixed positions relative to a detector array rather than undertake frequent towed surveys. The VED antenna(e) could be anchored to the seafloor or suspended from a oil-rig platform, for example. In other examples, the VED antenna(e) could be placed in a well or borehole, e.g. geotechnical borehole. The One (or more) VMD antenna(e) in fixed positions could also be used in conjunction with the VED antenna(e). However, since the subterranean structures to which VMD EM signals are sensitive are unlikely to change with time, the results of an initial VMD EM survey (or MT survey) may be sufficient without needing to reproduce the VMD (or MT) part of the EM surveying. In the case of a producing oil field, the subterranean structures are likely to be well known already from prior geophysical surveys and drilling results. Indeed, prior geophysical and geological information from the oil field can be used to construct a background model without the need to collect VMD (or MT) data at any stage.

The Effects of the Seawater Surface

A further consideration in designing an efficient EM survey (for instance when determining the range of source-detector separations R over which measurements can reliably be made) is the effects of the seawater surface on the propagation of the VED and/or VMD EM signals.

In shallow water depths, it is possible for EM signals from an EM source to follow a propagation path upwards through the seawater to the surface; horizontally through the air; and back down through the seawater to the seafloor detector. This 'airwave' component contains no information about the subterranean resistivity and so preferably should not dominate the detector signal.

When using a HED antenna, the air wave component tends to dominate the detector signals in shallow water and at long source-detector separations. The higher the frequency of a drive signal applied to a HED antenna, the shorter the offset at which the airwave begins to dominate the detector signals. The effect of the airwave can be minimised by choosing appropriate transmission frequencies, and by targeting EM surveys on prospects in deep water and in which the target is at a relatively shallow depth below the seafloor [6].

The effect of the seawater surface is very different for a VED EM signal than for the signal from a HED antenna. A VED antenna induces predominantly vertical current loops in the seawater. Because the vertical component of electric field is discontinuous at the sea surface (i.e. electric currents cannot flow across the interface), instead of propagating through the air, the EM energy carried in the EM signal is reflected back into the water. The effect of the seawater surface on a VED EM signal is therefore to introduce a surface-reflected signal component (as opposed to an airwave signal component) into the VED detector signal. Because the surface-reflected signal is rapidly attenuated by the conducting seawater, the effect of the seawater surface on a VED EM signal is more apparent at shorter source-detector separations than at longer source-detector separations.

Figure 12A:
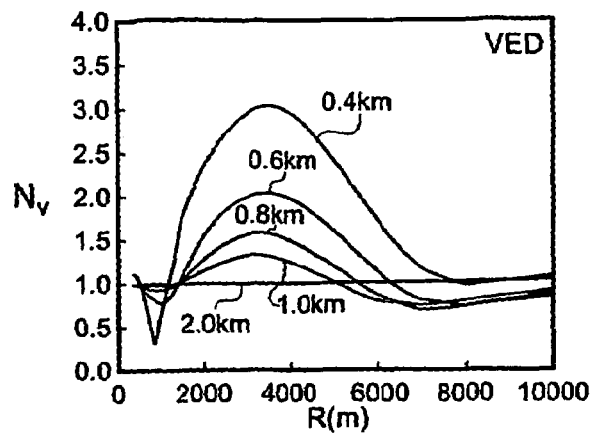
FIG. 12a is a graph showing the normalised strength of the vertical component of electric field seen at a detector in response to a VMD EM signal for different depths of seawater.

FIG. 12a is a graph schematically showing model normalised vertical electric field component amplitudes, $N_V$, seen at a detector in response to a VED EM source signal as a function of separation, or range, R, between the VED antenna and the detector for a number of different overlying depths of seawater. The vertical electric field components are calculated for a uniform isotropic half-space subterranean strata configuration with resistivity 1 Ωm, and seawater with resistivity 0.3 Ωm, and a depth as indicated on each of the curves in the figure. In each case the electric field components are normalised by the modelled electric field components seen at a detector with the normalising model subterranean strata configuration described above (i.e. a uniform isotropic half-space subterranean strata configuration with resistivity 1 Ωm and seawater with resistivity 0.3 Ωm and infinite depth). As before, the VED AC drive signal is a quasi-square wave at a frequency of 0.25 Hz and the electric fields are calculated per unit source electric dipole moment. The VED antenna is 100 m long and supported such that the lower electrode is 10 m above the seafloor.

Figure 12B:
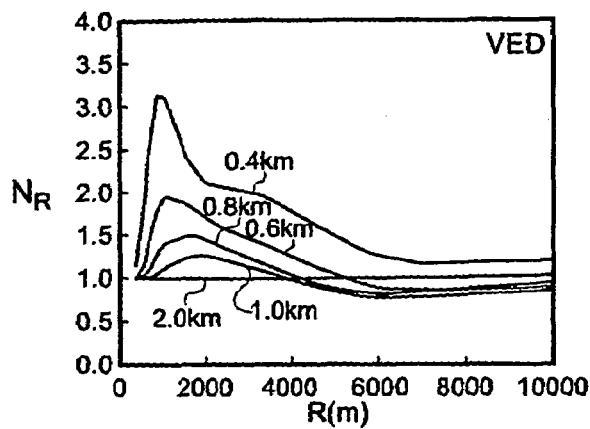
FIG. 12b is a graph showing the normalised strength of the radial component of electric field seen at a detector in response to a VMD EM signal for different depths of seawater.

FIG. 12b is a graph schematically showing model normalised radial electric field component amplitudes, $N_R$, seen at a detector in response to a VED EM signal as a function of separation, or range, R, between the VED antenna and the detector for a number of different overlying depths of seawater. FIG. 12b is otherwise similar to and will be understood from the description of FIG. 12a above.

It is apparent from FIGS. 12a and 12b that the effects of a finite water depth on VED detector signals are most apparent in shallow water and at short source-detector separations. Larger values of $N_V$ or $N_R$ indicate that a larger fraction of the detector signal is due to the surface-reflected signal component. For example, at a detector-source separation of around 1000 m, and a water depth of 0.6 km, the radial component of the electric field is approximately double that seen at the same separation with an infinite depth of water (i.e. $N_R$=2), the increase in detector signal being due to the surface-reflected signal component.

As seen in FIGS. 5a, 5b and 7, the presence of a hydrocarbon layer in an otherwise homogeneous subterranean strata configuration becomes apparent at source-detector separations beyond around 4000 m and 6000 m for the radial and vertical electric field components seen at a detector in response to a VED EM source signal respectively. However, it can also be seen that the effects of finite seawater depth shown in FIGS. 12a and 12b are beginning to fall away beyond these detector-source separations (i.e. $N_V$ and $N_R$ are approaching unity), especially for seawater depths greater than around 0.6 km. This is in contrast to a HED antenna for which finite seawater depths can strongly affect detector signals at source-detector separations similar to those at which the detector signals are typically most sensitive to a hydrocarbon layer or reservoir. Accordingly, surveys which employ a VED antenna can be satisfactorily performed in shallower water than those employing conventional HED systems.

For the VMD EM signal, the airwave component is present. It is similar to that observed with an HED, in that it dominates at long range and high frequency (for a given water depth) [15]. However since the response to a VMD is sensitive only to the background structure, and not to the hydrocarbon layer the VMD airwave component does not present a major problem.

On the Detection of the Edges of a Hydrocarbon Layer by this Technique

The model subterranean strata configurations used above to show how a combination of a VED and a VMD antenna can be used to detect a hydrocarbon layer and distinguish it from a general increase in resistivity with depth have all been 1D models (i.e. horizontal layers of infinite horizontal extent). However, VED and VMD antennae EM surveying also works well in cases where a hydrocarbon layer comprises a reservoir of finite horizontal extent, and can also be used as a reliable means of locating the edges of an already identified reservoir structure.

Figure 13A:
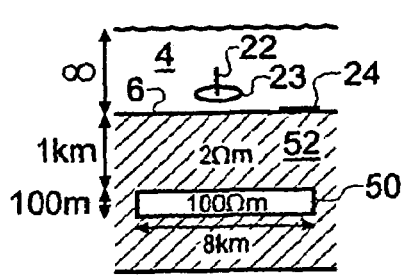
FIG. 13a schematically shows in vertical section another model subterranean strata configuration.

FIG. 13a shows in schematic vertical section a fourth, or 3D model subterranean strata configuration. A VED antenna 22, a VMD antenna 23 and a detector antenna 24 are shown. The 3D model subterranean strata configuration includes a section of seafloor 6 beneath an infinite depth of seawater 4 with resistivity 0.3 Ωm. The strata beneath the seafloor 6 comprise a finite-extent hydrocarbon layer 50 within an otherwise uniform background structure 52 of infinite horizontal and semi-infinite vertical extent. The uniform background structure has a resistivity of 2 Ωm. The finite-extent hydrocarbon layer has a vertical thickness of 100 m and an 8×8 km square extent in a horizontal plane, its upper face is 1 km below the seafloor, it has a resistivity of 100 Ωm and its centre is directly below the VED and VMD antennae.

Figure 13B:
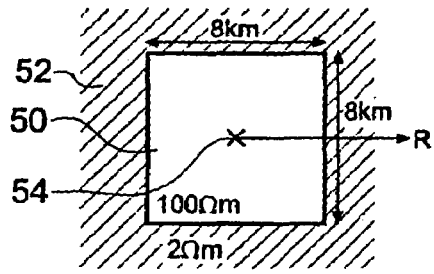

FIG. 13b shows a schematic horizontal section through the centre of the finite-extent hydrocarbon layer 20 within the 3D model subterranean strata configuration shown in FIG. 13a. The projected position of the VED and VMD antennae are marked by a cross 54.

Figure 14:
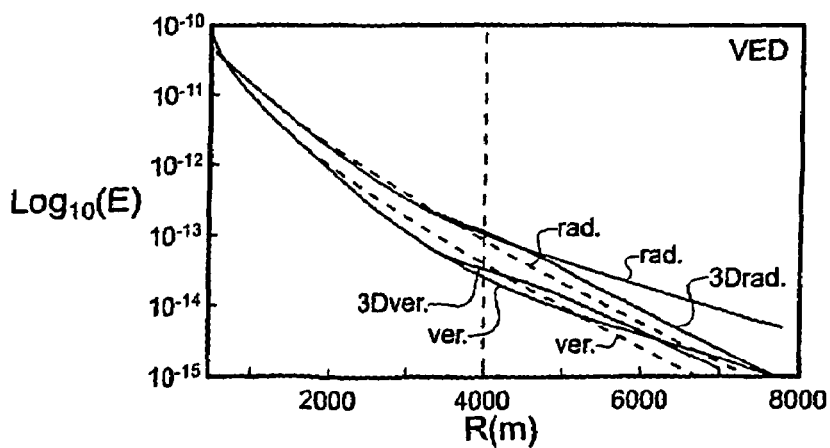
FIG. 14 is a graph schematically showing the strength of the vertical and radial components of electric field seen at a detector in response to a VED EM signal for three different subterranean strata configurations.

FIG. 14 is a graph schematically showing the logarithm of the modelled radial and vertical electric field component amplitudes, $Log_{10}(E)$, seen by a detector in response to a VED EM signal as a function of separation, or range, R, between the VED antenna and the detector for various subterranean strata configurations. The separation between the source and the detector is made horizontally at the seafloor along a direction within the plane of FIG. 13a and as denoted by the arrow marked R in FIG. 13b. In this example, the VED AC drive signal is a quasi-square wave at a frequency of 0.5 Hz and the electric fields are calculated per unit source electric dipole moment. The VED antenna is modelled as a point dipole source and supported 10 m above the seafloor. The curves marked 3D-ver and 3D-rad respectively show the modelled radial and vertical electric field component amplitudes seen in response to the VED EM signal for the 3D model subterranean strata configuration shown in FIGS. 13a and 13b. For comparison, curves similar to those shown in FIG. 5a (i.e. detailing the response of a normalising model subterranean strata configuration (dashed lines) and a 1D hydrocarbon model subterranean strata configuration (solid lines)) are shown, but for consistency are computed for a 0.5 Hz VED AC drive signal and a background structure resistivity of 2 Ωm, as opposed to a 0.25 Hz VED AC drive signal and 1 Ωm background structure resistivity. As in FIG. 5a, these comparison curves are marked ver and rad for the vertical and radial electric field components, and shown as solid and dashed lines for the hydrocarbon and normalising model subterranean strata configurations respectively.

The effects of the finite extent hydrocarbon layer on an otherwise uniform background are clear in FIG. 14 from the difference between the curves marked 3D-ver and 3D-rad and the dashed-line curves marked ver and rad. The effects of the finite extent of the finite extent hydrocarbon layer are clear in FIG. 14 from the difference between the curves marked 3D-ver and 3D-rad and the solid-line curves marked ver and rad When both the source and detector are above the finite extent hydrocarbon layer (i.e. at source-detector separations R<4 km) the curves representing the 3D model subterranean strata configuration (marked 3D-ver and 3D-rad) closely follow the curves representing the 1D hydrocarbon model subterranean strata configuration (solid-lines marked ver and rad). When the detector is not above the finite extent hydrocarbon layer (i.e. at source-detector separations R>4 km), the curves representing the 3D model subterranean strata configuration begin to approach those representing the normalising model subterranean strata configuration (dashed-lines marked ver and rad).

Signal Requirements for Surveying

The EM surveying methods described above can be readily applied to surveys for hydrocarbon resources on continental margins.

The required EM source and detector characteristics in terms of power, signal to noise ratios and operating parameters will depend on application and can in general be met by existing instrumental technology, as can be seen by comparing the modelled electric field amplitude with recent publications from the academic sector. Seafloor electric field detectors can routinely measure electric field detector signals of $10^{-11}$ V/m [7, 14].

It can be seen from FIGS. 5a, 9a and 14 that at source-detector separations of around 8000 m, where the modelled VED detector signal is around $10^{-15}$ V/m per unit source electric dipole moment, a detector signal of $10^{-11}$ V/m can be obtained by driving the VED antenna with a VED AC drive signal capable of producing an electric dipole moment of around 10,000 Am. For the VED antenna described above, a suitable VED AC drive signal can be provided by a signal power supply unit and cycloconverter similar to those employed in a deep-towed active source instrument (DASI) currently in use [1, 8].

As can be seen from FIGS. 6a and 10a, the order of magnitude of the VMD detector signal electric field strengths are generally lower than the VED detector signal electric field strengths. Accordingly, a larger source dipole moment is required to provide detector signals which are detectable at appropriate source-detector separations. For example, at a source-detector separation of around 8000 m, the modelled VMD detector signal is around $10^{-17}$ V/m per unit source magnetic dipole moment. Accordingly, to distinguish between different subterranean strata configurations, a VMD antenna magnetic dipole moment of $10^6$ Am$^2$ is required. This could be accomplished, for example, with a 3 m diameter loop VMD antenna comprising 1000 turns being driven by a VMD AC drive signal capable of providing a current of 150 A. The VMD antenna presents a substantially inductive load, however, power supplies for driving such loads are readily available, for instance power supplies currently used for electric trains or train motors, or other heavy industrial machinery, which present a high inductance load could be used.

Alternative Embodiment Based on VED Surveying Only

According to an alternative embodiment, it is sufficient to collect VED data only. Instead of comparing the VED survey data set with a VMD (or MT) survey data set after normalisation of each set, it is possible to compare the VED data only with a suitable normalisation data set. In the above it has been assumed that the normalisation data sets do not have high integrity as regards resistivity profile especially, as will usually be the case when an area is poorly surveyed, for example when conducting initial exploration. However, in some cases an area will be very well characterised by previous surveying. For example, in a producing oilfield there is likely to be a wealth of existing seismic and well-log data. In this case, a background rock formation model can be created from the seismic data and then resistivities assigned to the various components in the rock structure using the resistivities obtained from well-log data (If directly applicable well-log data is not available, it may be possible to estimate resistivity values by comparison with resistivity data from nearby wells in similar geological structures.) For these reasons, the present embodiment will be especially suited to applications in existing oilfields, such as monitoring long term depletion of reserves, as described above under the heading edge detection.

Since the geological/geophysical data, such as seismic and well-log data, input into the rock formation model in this embodiment will be essentially blind to the presence of hydrocarbon, it may be thought of as performing an analogous role to the VMD or MT data in the previously embodiments.

When monitoring depletion, it may be sufficient to directly compare VED survey data sets taken at different times, e.g. several weeks or months apart, without use of normalisation. However, normalisation will generally be desirable, either using VMD, MT or rock formation model data as discussed above.

CONCLUSIONS

The above description shows how controlled source electromagnetic surveying of subterranean strata using a VED antenna and a VMD antenna (or other source for inducing horizontal current flows) can allow the technique to be successfully applied to the problem of detecting hydrocarbon layers or reservoirs beneath the seafloor. In particular, we have identified that:

A high quality survey can be carried out using a combination of a mobile EM source including a VED antenna and a VMD antenna operated just above the sea bed, and an array of detectors including electric and/or magnetic field sensing detector antenna placed statically on the seafloor.

The effects of a finite seawater depth are less severe than seen when using a HED antenna This allows a VED antenna to be operated in shallower seawater and in other circumstances where a HED antenna might not be useable.

For purposes of data presentation and interpretation it is helpful to employ detector signal parameters that have been normalised with reference to an appropriate simplified model of the subterranean strata.

In order to resolve the presence of a hydrocarbon layer, and to distinguish the effect of such a layer from other likely subterranean strata configurations, it is important to record detector signals seen in response to both inductively (i.e. horizontal current flow) and galvanically (i.e. vertical current flow) coupled modes of induced current flow.

3D modelling shows that with an appropriately positioned array of detectors, and with an appropriate source tow track, the method can yield valuable information about the limits of the areal extent of any subterranean hydrocarbon layer, as well as detecting its presence.

Using a VED antenna, the method can also be extended to EM sounding in wells, for use in 4D reservoir monitoring. This would also improve the coupling of the VED EM signals into the subterranean strata.

It will be understood that whilst the above description has concentrated on dipolar EM sources, similar methods employing other appropriately configured higher order multipoles, for example quadrupoles or octopoles could also be used.

Finally it will also be understood that the invention is equally applicable to surveying of freshwater, for example large lakes, so that references to seafloor, seawater etc. should not be regarded as limiting.

REFERENCES

[1] Sinha, M. C., Patel, P. D., Unsworth, M. J., Owen, T. R. E. & MacConnack, M. R. G. An active source electromagnetic sounding system for marine use. *Mar. Geophys. Res.*, 12, 1990, 59-68.
[2] Evans, R. L., Sinha, M. C., Constable, S. C. & Unsworth, M. J. On the electrical nature of the axial melt zone at 13°N on the East Pacific Rise. *J Geophys. Res.*, 99, 1994, 577-588
[3] Edwards, R. N., Law, K. L., Wolfgram, P. A., Nobes, D. C., Bone, M. N., Trigg, D. F. & DeLaurier, J. M., First result of the MOSES experiment: Sea sediment conductivity and thickness determination, Bute Inlet, Columbia, bu magnetometric offshore electrical sounding, *Geophysics*, 50, 1985, 153-161
[4] WO 00/13046 A1
[5] WO 00/57555 A1
[6] Eidesmo, T., Ellingsrud, S., MacGregor, L. M., Constable, S., Sinha, M. C., Johansen, S, Kong, F-N & Westerdahl, H., Sea Bed Logging (SBL), a new method for remote and direct identification of hydrocarbon filled layers in deepwater areas, *First Break;* 20, 2002, 144-152.
[7] Ellingsrud, S., Sinha, M. C, Constable, S., MacGregor, L. M., Eidesmo, T. & Johansen, S., Remote sensing of hydrocarbon layers by sea-bed logging (SBL): Results from a cruise offshore Angola, *The Leading Edge*, submitted 2002.
[8] MacGregor, L. M. & Sinha, M. C. Use of marine controlled source electromagnetic sounding for sub-basalt exploration. *Geophysical Prospecting*, 48, 2000, 1091-1106.
[9] WO 02/14906 A1
[10] MacGregor, L. M., Constable, S. C. & Sinha, M. C. The RAMESSES experiment III: Controlled source electromagnetic sounding of the Reykjanes Ridge at 57° 45' N. *Geophysical Journal International*, 135, 1998, 773-789.
[11] MacGregor, L., Sinha, M. & Constable, S. Electrical resistivity structure of the Valu Fa Ridge, Lau Basin, from marine controlled source electromagnetic sounding. *Geophys. J Int.*, 146, 217-236, 2001.
[12] Constable, S., Orange, A. S., Hoverston, G. M. & Morrison, M. Marine magnetotellurics for petroleum exploration Part I: A sea-floor equipment system. *Geophysics*, 63, 1998, 816-825
[13] Chave, A. D. & Cox, C. S., 1982. Controlled electromagnetic sources for measuring electrical conductivity beneath the oceans, 1. Forward Problem and model study, *J. Geophys. Res.*, 87, p 5327-5338
[14] U.S. Pat. No. 5,770,945
[15] Coggon, J. H. & Morrison, H. F., Electromagnetic investigation of the seafloor, *Geophysics*, 35, 1970 p 476-489
[16] Edwards, B. N., Law, L. K., & DeLaurier, J. M. On measuring the electrical conductivity of the oceanic crust by a modified magnetometric resistivity method. *J. Geophys. Res.*, 86, 1981, p 11609-11615.

The invention claimed is:

1. A method of analyzing results from an electromagnetic survey of an area that is thought or known to contain a subterranean hydrocarbon reservoir, comprising:
   providing a first survey data set obtained from a vertical electric dipole (VED) source;
   providing a second survey data set obtained from a vertical magnetic dipole (VMD) source;
   generating a first normalization data set specific to the first survey data set;
   generating a second normalization data set specific to the second survey data set;
   combining the first survey data set and first normalization data set to obtain a first results data set that represents a difference between the first survey data set and the first normalization data set;
   combining the second survey data set and second normalization data set to obtain a second results data set that represents a difference between the second survey data set and the second normalization data set; and
   comparing the first and second results data sets to provide a determination if hydrocarbon is present.

2. A method of analyzing results from an electromagnetic survey according to claim 1, further comprising:
   normalizing each of the first and second survey data sets relative to the respective first and second normalization data sets or first and second functions specific to the first and second data sets respectively.

3. A method of analyzing results from an electromagnetic survey according to claim 1, wherein the first and second normalization data sets or functions are calculated from a rock formation model.

4. A method of analyzing results from an electromagnetic survey according to claim 1, wherein the first and second normalization data sets or functions are calculated from the first and second survey data sets.

5. A method of analyzing results from an electromagnetic survey according to claim 1, wherein the first results data set represents the difference between the first survey data set and the first normalization data set as a function of position within the area, and the analysis of the first results data set includes identifying a location of a boundary of the subterranean hydrocarbon reservoir.

6. A computer program product bearing machine readable instructions stored on a computer-readable media for implementing a method of analyzing results from an electromagnetic survey by:
   providing a first survey data set obtained from a vertical electric dipole (VED) source;
   providing a second survey data set obtained from a vertical magnetic dipole (VMD) source;
   generating a first normalization data set specific to the first survey data set;
   generating a second normalization data set specific to the second survey data set;

combining the first survey data set and first normalization data set to obtain a first results data set that represents a difference between the first survey data set and the first normalization data set;

combining the second survey data set and second normalization data set to obtain a second results data set that represents a difference between the second survey data set and the second normalization data set; and comparing the first and second results data sets to provide a determination if hydrocarbon is present.

7. A computer apparatus loaded with machine readable instructions for implementing a method of analyzing results from an electromagnetic survey by:

providing a first survey data set obtained from a vertical electric dipole (VED) source;

providing a second survey data set obtained from a vertical magnetic dipole (VMD) source;

generating a first normalization data set specific to the first survey data set;

generating a second normalization data set specific to the second survey data set;

combining the first survey data set and first normalization data set to obtain a first results data set that represents a difference between the first survey data set and the first normalization data set;

combining the second survey data set and second normalization data set to obtain a second results data set that represents a difference between the second survey data set and the second normalization data set; and comparing the first and second results data sets to provide a determination if hydrocarbon is present.

8. A method of analyzing results from an electromagnetic survey of an area that is thought or known to contain a subterranean hydrocarbon reservoir, comprising:

providing a first survey data set obtained from a vertical electric dipole (VED) source;

providing a second survey data set obtained from naturally occurring magnetotelluric (MT) electromagnetic fields;

generating a first normalization data set specific to the first survey data set;

generating a second normalization data set specific to the second survey data set;

combining the first survey data set and first normalization data set to obtain a first results data set that represents a difference between the first survey data set and the first normalization data set;

combining the second survey data set and second normalization data set to obtain a second results data set that represents a difference between the second survey data set and the second normalization data set; and comparing the first and second results data sets to provide a determination if hydrocarbon is present.

9. A method of analyzing results from an electromagnetic survey according to claim 8, further comprising:

normalizing each of the first and second survey data sets relative to the respective first and second normalization data sets or first and second functions specific to the first and second data sets respectively.

10. A method of analyzing results from an electromagnetic survey according to claim 8, wherein the first and second normalization data sets or functions are calculated from a rock formation model.

11. A method of analyzing results from an electromagnetic survey according to claim 8, wherein the first and second normalization data sets or functions are calculated from the first and second survey data sets.

12. A method of analyzing results from an electromagnetic survey according to claim 8, wherein the first results data set represents the difference between the first survey data set and the first normalization data set as a function of position within the area, and the analysis of the first results data set includes identifying a location of a boundary of the subterranean hydrocarbon reservoir.

13. A computer program product bearing machine readable instructions stored on a computer-readable media for implementing a method of analyzing results from an electromagnetic survey by:

providing a first survey data set obtained from a vertical electric dipole (VED) source;

providing a second survey data set obtained from naturally occurring magnetotelluric (MT) electromagnetic fields;

generating a first normalization data set specific to the first survey data set;

generating a second normalization data set specific to the second survey data set;

combining the first survey data set and first normalization data set to obtain a first results data set that represents a difference between the first survey data set and the first normalization data set;

combining the second survey data set and second normalization data set to obtain a second results data set that represents a difference between the second survey data set and the second normalization data set; and comparing the first and second results data sets to provide a determination if hydrocarbon is present.

14. A computer apparatus loaded with machine readable instructions for implementing a method of analyzing results from an electromagnetic survey by:

providing a first survey data set obtained from a vertical electric dipole (VED) source;

providing a second survey data set obtained from naturally occurring magnetotelluric (MT) electromagnetic fields;

generating a first normalization data set specific to the first survey data set;

generating a second normalization data set specific to the second survey data set;

combining the first survey data set and first normalization data set to obtain a first results data set that represents a difference between the first survey data set and the first normalization data set;

combining the second survey data set and second normalization data set to obtain a second results data set that represents a difference between the second survey data set and the second normalization data set; and comparing the first and second results data sets to provide a determination if hydrocarbon is present.

15. An electromagnetic survey method for surveying an area that is thought or known to contain a subterranean hydrocarbon reservoir, comprising:

obtaining a first survey data set from a vertical electric dipole (VED) source;

obtaining a second survey data set from a vertical magnetic dipole (VMD) source;

generating a first normalization data set specific to the first survey data set;

generating a second normalization data set specific to the second survey data set;

combining the first survey data set and first normalization data set to obtain a first results data set that represents a difference between the first survey data set and the first normalization data set;

combining the second survey data set and second normalization data set to obtain a second results data set that represents a difference between the second survey data set and the second normalization data set; and comparing the first and second results data sets to provide a determination if hydrocarbon is present.

16. An electromagnetic survey method according to claim 15, wherein the VED source and the VMD source are mounted on a common submersible vehicle.

17. An electromagnetic survey method according to claim 15, wherein the first and second survey data sets are obtained together.

18. An electromagnetic survey method according to claim 15, wherein the first and second survey data sets are obtained separately.

19. An electromagnetic survey method according to claim 15, wherein the VED and VMD sources are operated at different frequencies.

20. An electromagnetic survey method for surveying an area that is thought or known to contain a subterranean hydrocarbon reservoir, comprising:

obtaining a first survey data set from a vertical electric dipole (VED) source;

obtaining a second survey data set from naturally occurring magnetotelluric (MT) electromagnetic fields;

generating a first normalization data set specific to the first survey data set;

generating a second normalization data set specific to the second survey data set;

combining the first survey data set and first normalization data set to obtain a first results data set that represents a difference between the first survey data set and the first normalization data set;

combining the second survey data set and second normalization data set to obtain a second results data set that represents a difference between the second survey data set and the second normalization data set; and comparing the first and second results data sets to provide a determination if hydrocarbon is present.

21. A method of planning an electromagnetic survey of an area that is thought or known to contain a subterranean hydrocarbon reservoir, comprising:

creating a model of the area to be surveyed including a seafloor, a rock formation containing a postulated hydrocarbon reservoir beneath the seafloor, and a body of water above the seafloor;

setting values for water depth, depth below the seafloor of the postulated hydrocarbon reservoir, and resistivity structure of the rock formation;

performing a simulation of an electromagnetic survey in the model of the survey area by obtaining a first survey data set from a simulated vertical electric (VED) dipole source and a second survey data set from a simulated vertical magnetic dipole (VMD) source;

generating a first normalization data set specific to the first survey data set;

generating a second normalization data set specific to the second survey data set;

combining the first survey data set and first normalization data set to obtain a first results data set that represents a difference between the first survey data set and the first normalization data set;

combining the second survey data set and second normalization data set to obtain a second results data set that represents a difference between the second survey data set and the second normalization data set; and comparing the first and second results data sets to provide a determination if hydrocarbon is present.

22. A method of planning an electromagnetic survey according to claim 21, further comprising:

repeating the simulation for a number of source-to-detector distances and frequencies in order to select optimum surveying conditions in terms of source-to-detector distance for probing the hydrocarbon reservoir.

23. A method of planning an electromagnetic survey according to claim 21, wherein the model includes a body of air above the body of water, and wherein the simulation takes account of signal propagation paths including the body of air when calculating the first and second survey data sets.

24. A method of planning an electromagnetic survey according to claim 21, further comprising:

normalizing each of the first and second survey data sets relative to respective first and second normalization data sets or functions specific to the first and second survey data sets respectively.

25. A method of planning an electromagnetic survey of an area that is thought or known to contain a subterranean hydrocarbon reservoir, comprising:

creating a model of the area to be surveyed including a seafloor, a rock formation containing a postulated hydrocarbon reservoir beneath the seafloor, and a body of water above the seafloor;

setting values for water depth, depth below the seafloor of the postulated hydrocarbon reservoir, and resistivity structure of the rock formation;

performing a simulation of an electromagnetic survey in the model of the survey area by obtaining a first survey data set from a simulated vertical electric (VED) dipole source and a second survey data set from simulated magnetotelluric (MT) electromagnetic fields;

generating a first normalization data set specific to the first survey data set;

generating a second normalization data set specific to the second survey data set;

combining the first survey data set and first normalization data set to obtain a first results data set that represents a difference between the first survey data set and the first normalization data set;

combining the second survey data set and second normalization data set to obtain a second results data set that represents a difference between the second survey data set and the second normalization data set; and comparing the first and second results data sets to provide a determination if hydrocarbon is present.

26. A method of planning an electromagnetic survey according to claim 25, further comprising:

repeating the simulation for a number of source-to-detector distances and frequencies in order to select optimum surveying conditions in terms of source-to-detector distance for probing the hydrocarbon reservoir.

27. A method of planning an electromagnetic survey according to claim 25, wherein the model includes a body of air above the body of water, and wherein the simulation takes account of signal propagation paths including the body of air when calculating the first and second survey data sets.

28. A method of planning an electromagnetic survey according to claim 25, further comprising:

normalizing each of the first and second survey data sets relative to respective first and second normalization data sets or functions specific to the first and second survey data sets respectively.

29. A computer program product bearing machine readable instructions stored on a computer-readable media for implementing the method of planning an electromagnetic survey by:
creating a model of the area to be surveyed including a seafloor, a rock formation containing a postulated hydrocarbon reservoir beneath the seafloor, and a body of water above the seafloor;
setting values for water depth, depth below the seafloor of the postulated hydrocarbon reservoir, and resistivity structure of the rock formation;
performing a simulation of an electromagnetic survey in the model of the survey area by obtaining a first survey data set from a simulated vertical electric (VED) dipole source and a second survey data set from a simulated vertical magnetic dipole (VMD) source;
generating a first normalization data set specific to the first survey data set;
generating a second normalization data set specific to the second survey data set;
combining the first survey data set and first normalization data set to obtain a first results data set that represents a difference between the first survey data set and the first normalization data set;
combining the second survey data set and second normalization data set to obtain a second results data set that represents a difference between the second survey data set and the second normalization data set; and
comparing the first and second results data sets to provide a determination if hydrocarbon is present.

30. A computer program product bearing machine readable instructions stored on a computer-readable media for implementing a method of planning an electromagnetic survey by:
creating a model of the area to be surveyed including a seafloor, a rock formation containing a postulated hydrocarbon reservoir beneath the seafloor, and a body of water above the seafloor;
setting values for water depth, depth below the seafloor of the postulated hydrocarbon reservoir, and resistivity structure of the rock formation;
performing a simulation of an electromagnetic survey in the model of the survey area by obtaining a first survey data set from a simulated vertical electric (VED) dipole source and a second survey data set from simulated magnetotelluric (MT) electromagnetic fields;
generating a first normalization data set specific to the first survey data set;
generating a second normalization data set specific to the second survey data set;
combining the first survey data set and first normalization data set to obtain a first results data set that represents a difference between the first survey data set and the first normalization data set;
combining the second survey data set and second normalization data set to obtain a second results data set that represents a difference between the second survey data set and the second normalization data set; and
comparing the first and second results data sets to provide a determination if hydrocarbon is present.

31. A computer apparatus loaded with machine readable instructions for implementing a method of planning an electromagnetic survey by:
creating a model of the area to be surveyed including a seafloor, a rock formation containing a postulated hydrocarbon reservoir beneath the seafloor, and a body of water above the seafloor;
setting values for water depth, depth below the seafloor of the postulated hydrocarbon reservoir, and resistivity structure of the rock formation;
performing a simulation of an electromagnetic survey in the model of the survey area by obtaining a first survey data set from a simulated vertical electric (VED) dipole source and a second survey data set from a simulated vertical magnetic dipole (VMD) source;
generating a first normalization data set specific to the first survey data set;
generating a second normalization data set specific to the second survey data set;
combining the first survey data set and first normalization data set to obtain a first results data set that represents a difference between the first survey data set and the first normalization data set;
combining the second survey data set and second normalization data set to obtain a second results data set that represents a difference between the second survey data set and the second normalization data set; and
comparing the first and second results data sets to provide a determination if hydrocarbon is present.

32. A computer apparatus loaded with machine readable instructions for implementing a method of planning an electromagnetic survey by:
creating a model of the area to be surveyed including a seafloor, a rock formation containing a postulated hydrocarbon reservoir beneath the seafloor, and a body of water above the seafloor;
setting values for water depth, depth below the seafloor of the postulated hydrocarbon reservoir, and resistivity structure of the rock formation;
performing a simulation of an electromagnetic survey in the model of the survey area by obtaining a first survey data set from a simulated vertical electric (VED) dipole source and a second survey data set from simulated magnetotelluric (MT) electromagnetic fields;
generating a first normalization data set specific to the first survey data set;
generating a second normalization data set specific to the second survey data set;
combining the first survey data set and first normalization data set to obtain a first results data set that represents a difference between the first survey data set and the first normalization data set;
combining the second survey data set and second normalization data set to obtain a second results data set that represents a difference between the second survey data set and the second normalization data set; and
comparing the first and second results data sets to provide a determination if hydrocarbon is present.

33. In combination, a submersible vehicle for subsea electromagnetic surveying: a vertical electric dipole (VED) source carried by the submersible vehicle; and a vertical magnetic dipole (VMD) source carried by the submersible vehicle.

34. A combination according to claim 33, wherein the VED source and the VMD source comprise respective antennae mounted such that their dipole axes are aligned.

35. A combination according to claim 33, further comprising at least one waveform generator operable to transform a high voltage, low current AC drive signal received from an umbilical cable into a low voltage, high current AC drive signal to drive the VMD and VED antennae.

36. A survey apparatus comprising:
a submersible vehicle comprising a vertical electric dipole (VED) source and a vertical magnetic dipole (VMD) source;

a signal power supply unit for generating a high voltage, low current signal power supply for the submersible vehicle; and an umbilical cable releasably connectable at ends thereof to the signal power supply unit and the submersible vehicle.

37. A survey apparatus according to claim 36, further comprising a plurality of electromagnetic signal detectors.

38. In combination, a surface vessel and a survey apparatus according to claim 36, wherein the submersible vehicle is coupled to the surface vessel by the umbilical cable.

39. In combination, a static platform and a survey apparatus according to claim 36, wherein the submersible vehicle is coupled to the static platform by the umbilical cable.

40. In combination, a well and a survey apparatus according to claim 36, wherein the submersible vehicle is coupled to the well by the umbilical cable.

41. In combination, a borehole and a survey apparatus according to claim 36, wherein the submersible vehicle is coupled to the borehole by the umbilical cable.

* * * * *